United States Patent

[11] 3,586,770

| [72] | Inventors | Robert L. Bonebreak<br>Los Angeles;<br>William A. Chambers, Torrance, both of, Calif. |
|---|---|---|
| [21] | Appl. No. | 664,547 |
| [22] | Filed | Aug. 30, 1967 |
| [45] | Patented | June 22, 1971 |
| [73] | Assignee | Hughes Aircraft Company<br>Culver City, Calif. |

[54] ADAPTIVE GATED DIGITAL TRACKER
15 Claims, 13 Drawing Figs.

[52] U.S. Cl. .................................................. 178/6.8, 244/3.17
[51] Int. Cl. ................................................... H04n 3/14
[50] Field of Search .......................................... 178/6.8; 250/203 CT; 88/1; 244/3.17

[56] References Cited
UNITED STATES PATENTS
3,120,578  2/1964  Potter et al. .................. 250/203 X
3,372,890  3/1968  Bogard et al. ................. 244/3.17
3,416,752  12/1968  Hembra ......................... 244/3.17

Primary Examiner—Rodney D. Bennett, Jr.
Assistant Examiner—William T. Rifkin
Attorneys—James K. Haskell and Walter J. Adam ABSTRACT: A system for distinguishing a designated object in space from objects of similar intensity within the receiving aperture of a TV (television) camera and for determining the location thereof. A video processor, coupled to the TV camera limits the system's response to signals representative of the inner intensity contour of possible targets. A digital processor, in response to the video processor output signals, determines the difference between the angular location of the designated object and a previously stored estimate of this position and updates the stored position. The updating function of the digital processor is normalized by the target's image dimensions so that the tracking response of the system is essentially independent of target image size.

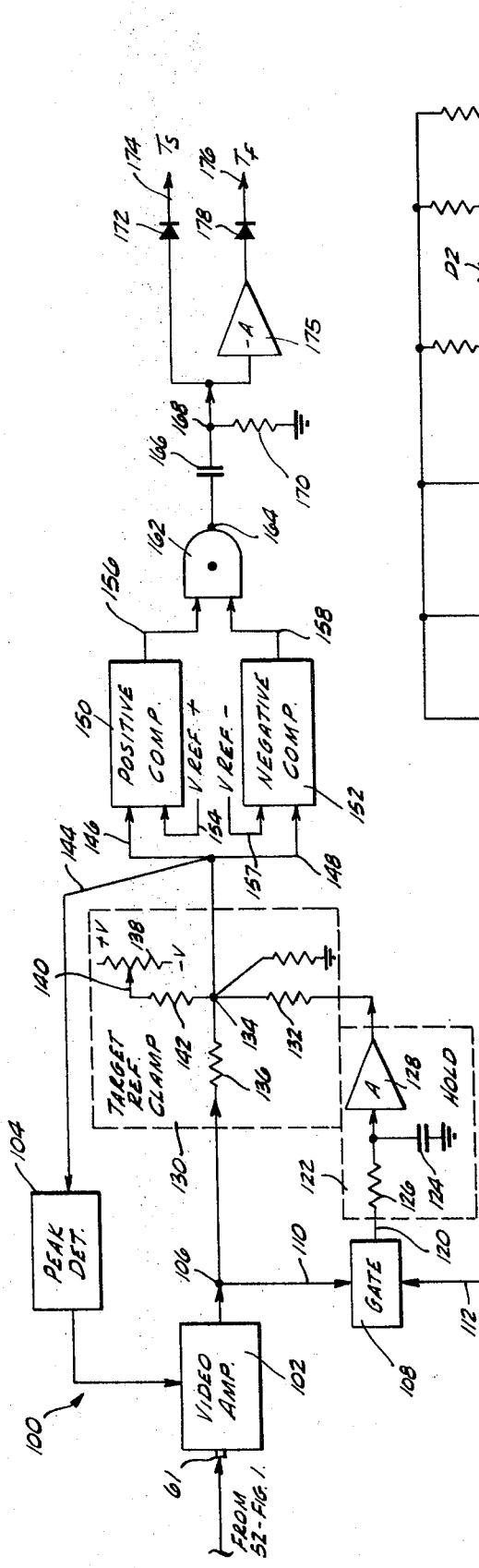
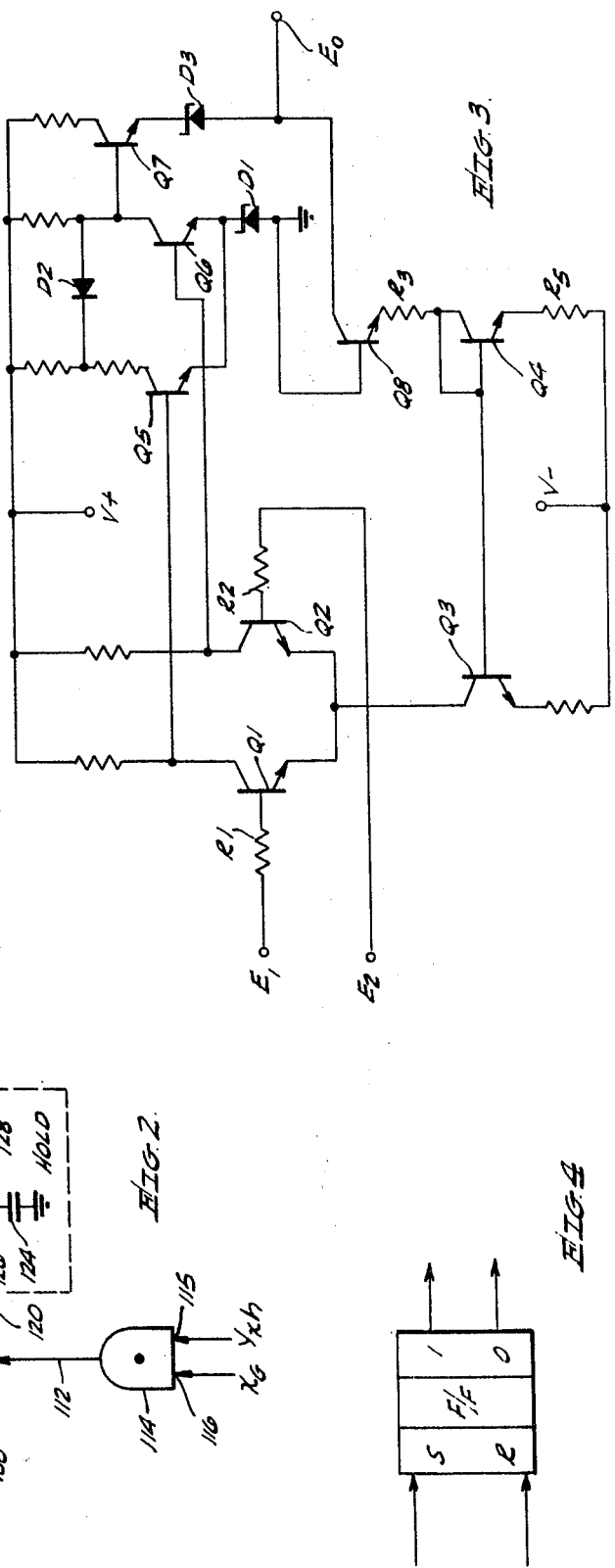

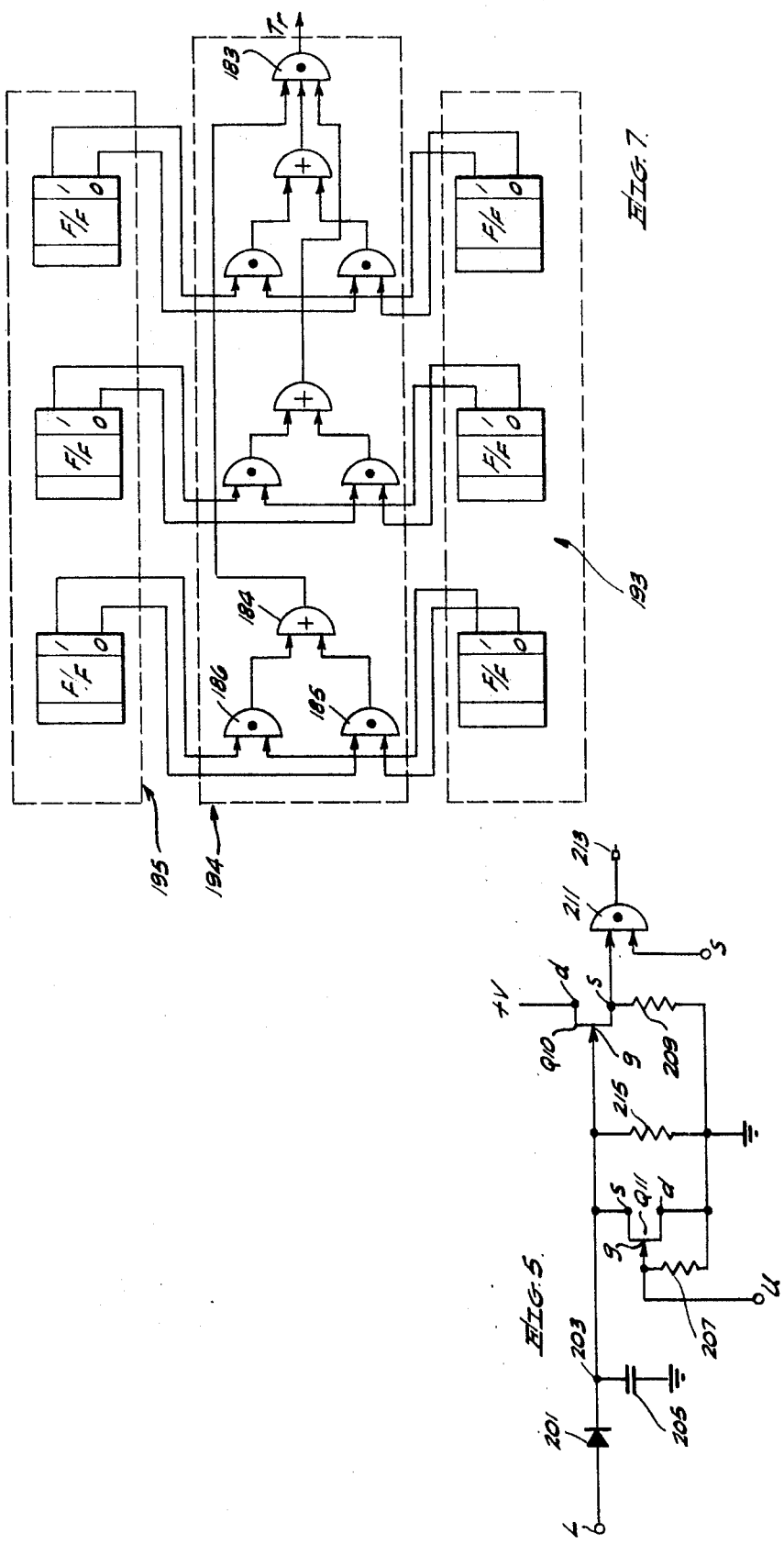

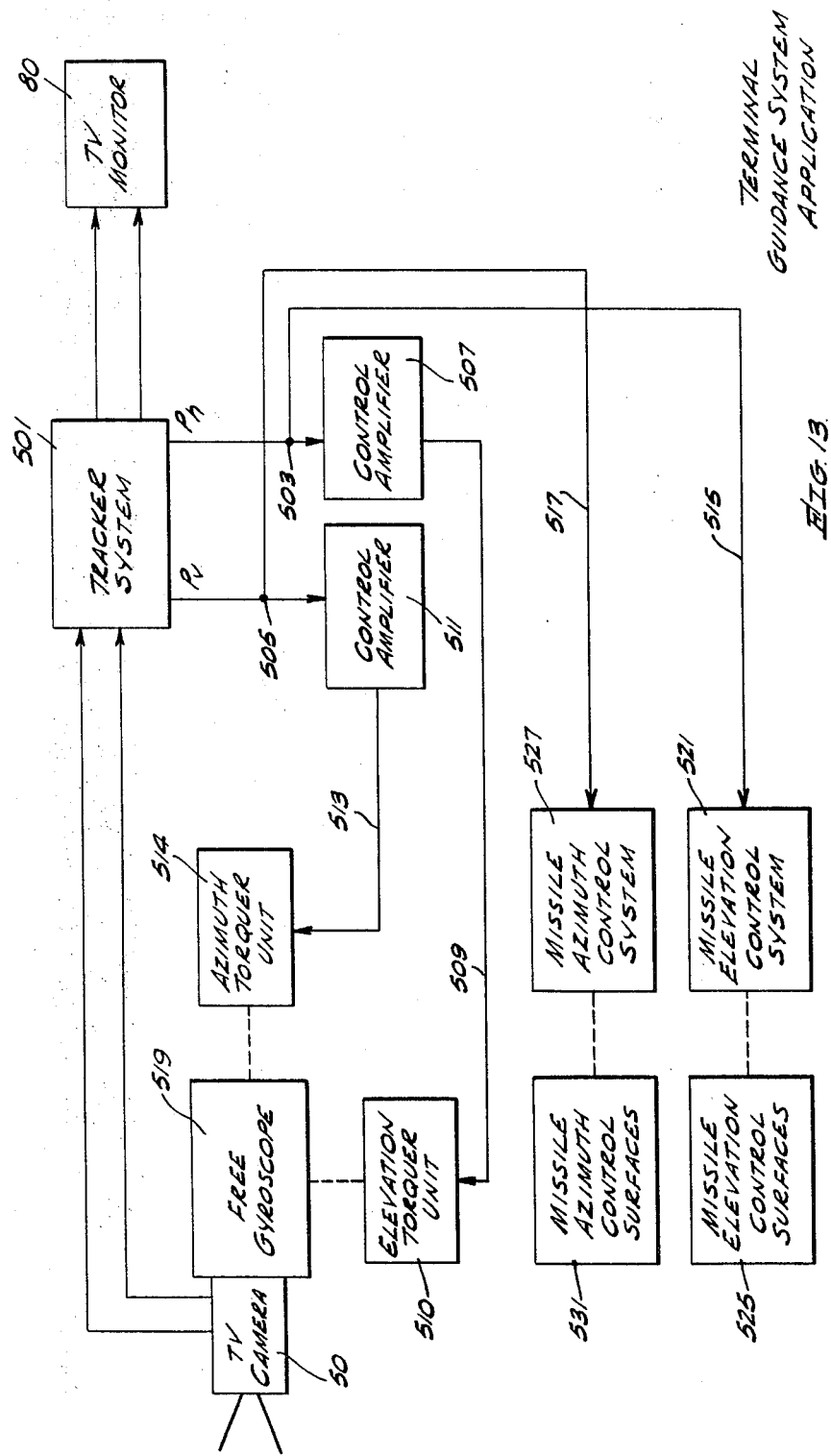

ADAPTIVE GATED DIGITAL TRACKER

BACKGROUND OF THE INVENTION

This invention relates generally to video tracking systems and particularly to improved digital tracking systems for providing stable and accurate tracking over large variations in target image size.

The systems in accordance with the principles of the invention may be used, for example, as the guidance control subsystem for air-to-air, air-to-ground and ground-to-air missiles or for aircraft fire control systems. In missile guidance applications, the relative position of a designated target is determined by the tracking system and in response to this position information a control system directs the missile towards the designated object. Such a tracking system must be capable of distinguishing a designated target from false targets of similar characteristics while maintaining accurate and stable tracking response over large variations in target image size as the missile closes on the target. In the prior art, numerous approaches have been taken to provide the aforementioned tracking requirements, however, the desirability of these attempts has been restricted by dynamic range limitations, excessive noise response or undue equipment complexity.

SUMMARY OF THE INVENTION

Briefly described, the present invention utilizes a sensor, such as a conventional TV camera, to convert the intensity pattern of received energy into amplitude variations of electrical signals. A video processor unit eliminates signals which are not representative of a designated target on the basis of signal amplitude comparisons, and digital logic circuits discriminate between the designated target and false targets on the basis of angular location. The designated target signals are digitized, counted and compared on opposite sides of previously stored reference positions to produce position error signals. These error signals, after normalization as a function of image size, are used to update the stored reference positions. The voltage signals representative of these reference positions are indicative of the area center of the designated target relative to the tracking axis of the sensor.

The system in accordance with the invention reduces equipment complexity by utilizing a unique logic processor that may be fabricated from simple and proven, basic digital building blocks. Tracking response to noise energy is minimized, in the system of the invention, by a processor technique that effectively limits the signals included in the tracking computation to those representative of the inner intensity contour of the selected target. Also the system of the invention normalizes the error signals as a function of target image size to provide increased dynamic range performance.

It is therefore an object of this invention to provide a tracking system of improved accuracy and stability with reduced equipment complexity.

It is further an object of this invention to provide a tracking system which accommodates large variations in target image size through the application of a novel digital target normalization technique.

It is a still further object of this invention to provide a tracking system that is reliably responsive to designated targets but not to false targets of similar characteristics.

It is another object of this invention to provide an accurate and stable tracking system that may utilize a conventional sensor scan pattern.

BRIEF DESCRIPTION OF THE DRAWINGS

The novel features which are believed to be characteristic of the invention, both as to its organization and method of operation, together with further objects and advantages thereof will be better understood from the following descriptions considered in connection with the accompanying drawings in which like characters refer to like parts and in which:

FIG. 2 is a schematic and block diagram of a suitable video processor unit for the system of FIG. 1;

FIG. 3 is a schematic diagram of a suitable comparator circuit for video processor unit of FIG. 2;

FIG. 4 is a diagram showing the symbol used in FIGS. 6 and 7 for a flip-flop circuit;

FIG. 5 is a schematic diagram of a suitable latching circuit for the $\dot{X}$ and $\dot{Y}$ logic processor of FIGS. 6 and 10;

FIG. 7 is a schematic diagram of a suitable digital comparator for the $\dot{X}$ and $\dot{Y}$ logic processors of FIGS. 6 and 10;

FIG. 13 is a block diagram showing a guidance system as an example of incorporation of the principles of the invention.

DESCRIPTION OF THE PREFERRED EMBODIMENT

Figure 1:
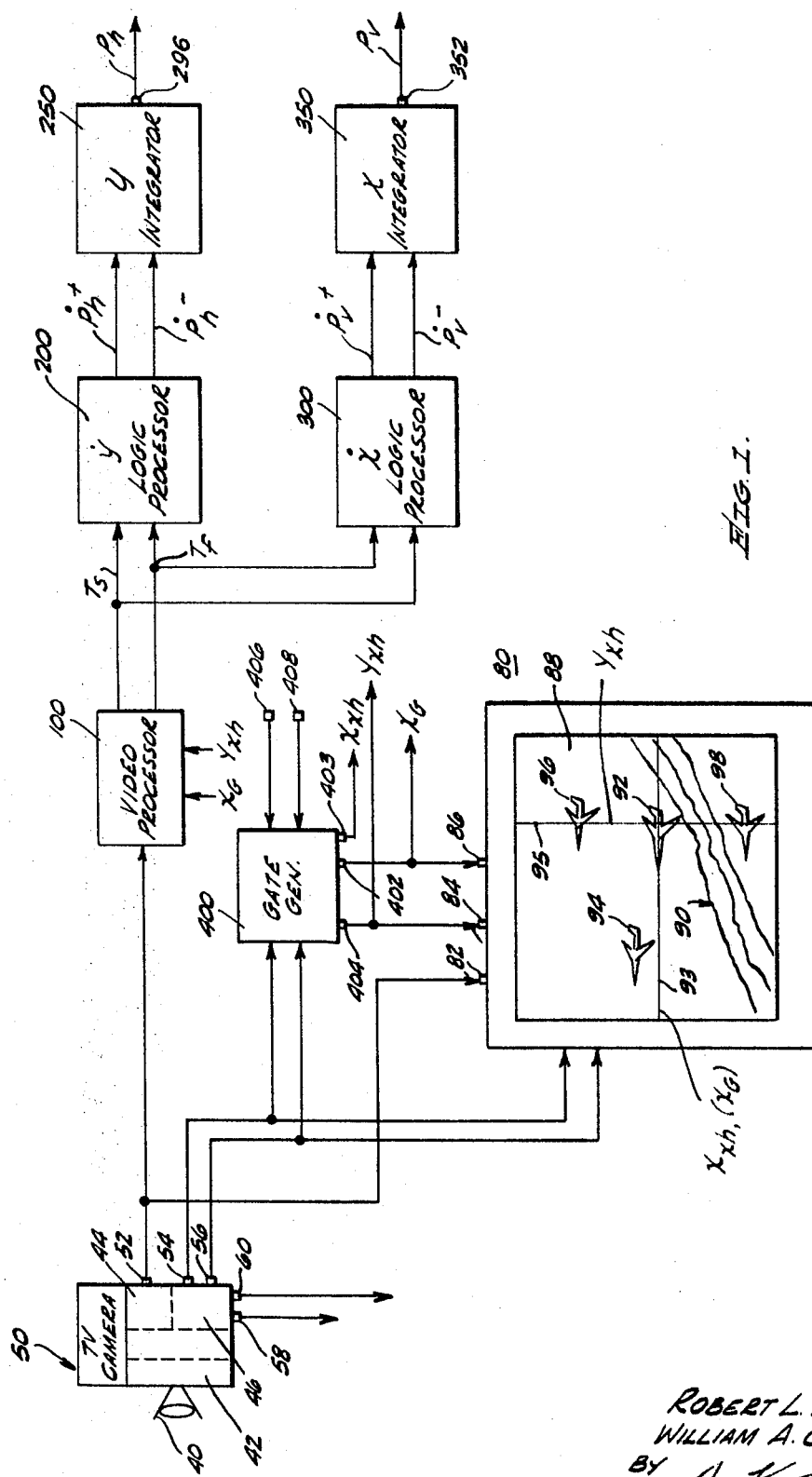
FIG. 1 is a block diagram showing the tracking system in accordance with this invention.

Referring first to FIG. 1, a TV (television) camera 50, which may be a conventional vidicon unit, includes an optical network 40 for forming images on a sensor 42 in response to energy received from a sector of space. A signal output circuit 44 of the TV camera 50 develops video signals at a terminal 52 which are amplitude representative of the energy received by increments of area of the sensor 42 as the sensor is scanned by the output circuit 44. A scan control circuit 46 controls the output circuit 44 in a conventional TV scan pattern and provides horizontal and vertical deflection signals at output terminals 54 and 56, respectively. Horizontal and vertical synchronization (sync) signals are also provided by scan control circuit 46 at output terminals 58 and 60, respectively.

The video signal at the terminal 52 is applied to an input terminal 82 of a conventional TV monitor 80. A pair of reference timing signals, $X_G$ and $Y_{xh}$, generated in a gate generator unit 400, are applied from terminals 402 and 404, respectively, to video input terminals 84 and 86 of the TV monitor 80. In response to the aforementioned video input signal, the TV monitor 80 produces images on a display tube 88 which are representative of the relative energy distribution within the field of view of the TV camera 50, as well as reference intensified lines 93 and 95 corresponding to the signal $X_G$ and $Y_{xh}$, respectively. The TV monitor 80 further includes deflection circuits (not shown) which are controlled by the horizontal and vertical deflection signals applied from terminals 54 and 56, respectively, of the TV camera 50.

A representative presentation of the display tube 88 is shown in FIG. 1 as including images 90, representative of terrain background, a designated target 92, false targets 94, 96, 98, a horizontal crosshair 93 and a vertical crosshair 95.

The system, in accordance with the principles of the invention, has an acquisition mode of operation in which the horizontal 93 and the vertical 95 crosshairs are independently controllable by the operator. To designate the target to be tracked, the operator superimposes the intersection of the crosshairs on the target. The circuitry for control of the crosshair positions is described in a subsequent portion of this specification.

A video processor unit 100 samples the signal amplitude applied from terminal 52 at the time of coincidence of reference timing signals $X_G$ and $Y_{xh}$ and produces target timing signals representative of the start ($T_s$) and finish ($T_f$) of possible targets, that is, targets within a predetermined amplitude range of the sampled value. For example, assuming the terrain images 90 have a lower intensity than the designated target image 92 and that the false targets 94, 96, and 98 have an intensity similar to that of the target 92; then the video processor unit will develop possible target timing signals for targets 92, 94, 96, and 98, but will exclude signals representative of the terrain image 90.

The signals $T_s$ and $T_f$ are processed by a $\dot{Y}$ logic processor unit 200 to discriminate between possible target signals and a designated target on a basis of the target's relative location. The $\dot{Y}$ logic processor also develops a normalized digital output signal $\dot{P}_h$ which is representative of the difference between the vertical area center of the target and a previously stored position $P_h$. The signal $\dot{P}_h$ is integrated by a Y integrator unit 250 to update the previous value of the signal $P_h$ which is applied from a terminal 296 to an input terminal 406 of the gate generator 400. In response to the signal $P_h$ the gate generator 400 updates the relative timing of the reference timing signal $X_G$, and thereby the position of the horizontal crosshair 93 on the display tube of TV monitor 80.

The signals $T_s$ and $T_f$ are processed by an $\dot{X}$ logic processor 300 and an X integrator unit 350 in a similar manner to that just described for the Y channel to provide a position signal $P_v$, which is representative of the position of the horizontal center of the designated target. The signal $P_v$ is applied from an output terminal 352 of the X integrator 350 to an input terminal 408 of the gate generator unit 400. In response to the signal $P_v$, the timing signal $Y_{xh}$ is updated and therefore the position of the vertical crosshair 95 on the display tube of the TV monitor 80.

The system, in accordance with the principles of the subject invention, will be better understood from the following detailed discussion of the units of the system of FIG. 1. Reference is now directed to FIG. 2 which is a block and schematic diagram of a processor suitable for the video processor 100 of FIG. 1. The signal at the output terminal 52 of the TV camera 50 (FIG. 1) is applied to an input terminal 61 of a conventional video amplifier 102 of the video processor unit 100. The gain of the amplifier 102, in response to the output of a conventional peak detector circuit 104, is adjusted to maintain the amplified peak to peak video signal at a terminal 106 within a predetermined voltage range. This output signal at the terminal 106 is applied to a convention video gate 108 through a lead 110. The gate 108 is controlled by gating pulses coupled on a lead 112 from an AND gate 114. All AND gates of the system of FIG. 1 may be of any suitable conventional type such as ones that produce a first level such as a high level output signal only when all input signals to the gate are at the first or high level state. In the illustrated system for all logical signals, an arbitrary positive potential may be considered indicative of the first or high level signal state and approximately zero potential representative of a second level such as a low level signal state. It is to be understood that the principles of the invention are applicable to any desired signal levels representative of true and false states and to any type of logic, such as the illustrated logic or to inverted logic.

The AND gate 114 produces a high level output pulse on the lead 112 only when the input signal $Y_{xh}$ and $X_G$ are simultaneously presented to the AND gate 114. The signal $Y_{xh}$ is applied through a lead 115 from terminal 404 of the gate generator 400 (FIG. 1) and is indicative of the time of occurrence of the vertical crosshair 95. The signal $X_G$ is applied through a lead 116 from terminal 402 of the gate generator 400 and is indicative of the time of occurrence of the horizontal crosshair 93. The circuitry for the generation of the signals $Y_{xh}$ and $X_G$ will be explained in detail in a subsequent portion of this specification. The output signal of the gate 108 is applied through a lead 120 to a hold circuit 122. A capacitor 124 of hold circuit 122 is charged by the signal on lead 120 through a resistor 126. The voltage level of the capacitor 124 is amplified and inverted by a conventional DC amplifier 128 and then coupled by a summing resistor 132 to a junction 134 of a target reference clamp circuit 130. The video signal at terminal 106 is coupled to the junction 134 through a summation resistor 136. A threshold control potentiometer 138 is connected between suitable positive and negative voltage supplies and has a wiper 140 that is coupled by summation resistor 142 to the junction 134. The signal level at junction 134 is the sum of the voltages coupled by resistors 132, 136 and 142, and is representative of the video signal of terminal 106 with an adjustment of its DC value such that the video voltage level at the occurrence of the gating pulse on lead 112 is a predetermined value, e.g., the video at this point could be clamped to ground. The output signal of target reference circuit 130 is coupled on leads 144, 146 and 148 to the peak detector 104, a positive comparator 150 and a negative comparator 152 respectively. The positive comparator 150 provides a high level output signal only during the time that the video input signal on lead 146 is less positive than a predetermined reference potential, designated $V_{ref.+}$, that is coupled to the comparator 150 on a lead 154. The negative comparator 152 produces a positive output signal only during the period that the video input signal on the lead 148 is more positive than a predetermined reference potential designated $V_{ref.1}$, coupled on a lead 157 to comparator 152.

The threshold level of the target reference circuit 130 and the reference levels of comparators 150 and 152 are functionally related in such a manner that the comparators' output signals on leads 156 and 158 are simultaneously at the high signal level only during the time period that the TV camera video (terminal 52 FIG. 1) is within a predetermined voltage level range of its value sampled at the intersection of the tracker crosshairs. This is due to the fact that the target reference circuit 130 shifts the DC potential of the TV camera video so that the voltage level of the video at the intersection of the crosshairs will be in the approximate center of a voltage discrimination window formed by the combination of comparators 150 and 152.

The signal amplitude discrimination operation will be better understood by reference to FIG. 3 which shows a representative type of high speed differential comparator. NPN type transistors Q1 and Q2 are biased by currents provided by input voltages E1 and E2 through resistors R1 and R2 respectively. When the circuit of FIG. 3 operates as the positive comparator 150, the leads 146 and 154 are respectively coupled to E1 and E2 and when the circuit operates as the negative comparator 152, the leads 148 and 157 are respectively coupled to E2 and E1. Transistors Q1 and Q2 compose a conventional balanced differential input stage and are supplied emitter current from a constant current source that includes transistor Q3, representing a high impedance source, and transistor Q4 in a diode configuration for temperature tracking. A balanced second stage is utilized with transistor Q6 being the second stage amplifier while transistor Q5 provides biasing for transistor Q6 such that the differential output signal of the input stage is supplied across the base-emitter junction of transistor Q6. A Zener diode D1, coupled to the emitter of transistors Q5 and Q6, provides large input voltage range capabilities and a diode D2 limits the positive voltage level at the collector of transistor Q6. A NPN transistor Q7 is connected in a conventional emitter follower configuration with a Zener diode D3 providing a DC level shift in the output circuit. A transistor stage comprising Q8 isolates the output signal from the constant current source bias divider of resistor R3, transistors Q4 and R5.

Referring now to FIG. 2 as well as the comparator circuit of FIG. 3, leads 146 and 154 of FIG. 2 are coupled to inputs E1 and E2, respectively of the circuit of FIG. 3 for providing the positive comparator 150. When the video signal potential at E1 is less positive than the reference voltage at E2, transistor Q6 is biased towards cutoff and $E_0$ assumes the high level signal state. Also, leads 148 and 157 of FIG. 2 are connected to a second comparator circuit of the type shown by FIG. 3 but now the video signal on lead 148 is coupled to the E2 input terminal and the reference voltage of lead 157 is coupled to the E1 input terminal so that $E_0$ assumes the high level state during the period the video signal exceeds the reference voltage. Consequently, the output signals on leads 156 and 158 are simultaneously at the high level state only during the period that the input signal voltage is more positive than the voltage of $V_{ref.1}$ and less positive than $V_{ref.+}$; that is, only when the video signal is in a predetermined voltage amplitude discrimination range about a voltage level determined by that of the image designated to be tracked.

The output signals on leads 156 and 158 are applied to an AND gate 162. The signal at an output terminal 164 of the AND gate 162 is at the high level state only during the presence of video signals of possible targets as determined by a signal amplitude similarities.

A capacitor 166 is coupled between the terminal 164 and a circuit junction point 168, and a resistor 170 is coupled between the junction 168 and ground. The possible target signal at terminal 164 is differentiated by the circuit composed of the capacitor 166 and resistor 170 to produce a positive pulse coincidental with the leading edge of the possible target signal and a negative pulse coincident with the trailing edge of the possible target signal at the junction 168. The positive signal developed at junction 168 is transmitted by a diode 172 to an output terminal 174 and is designated $T_s$ to indicate that it represents the time of occurrence of the start of a possible target. The negative pulse at the junction 168 is reversed in phase by a conventional amplifier 175 and then transmitted by a diode 178 to a terminal 176. This signal at the terminal 176, designated $T_f$, is representative of the time of occurrence of the trailing edge of a possible target signal.

The signals $T_s$ and $T_f$ are processed by the $\dot{Y}$ logic processor 200 to distinguish between possible targets and a designated target on the basis of the target's location relative to previously stored reference positions. Also the $\dot{Y}$ logic processor develops the signals $\dot{P}_h$ which is an updating function for the stored vertical reference position.

The $\dot{Y}$ and $\dot{X}$ logic processors utilize basic digital logic where the two binary conditions are labeled "1" and "0." The "1" condition indicates the presence of a signal and the "0" condition indicates the lack of a signal. A textbook "Digital Computer Components and Circuits," by T.K. Richards, 1957, published by Van Nostrand, provides a basic introduction to the digital circuits that may be utilized with the $\dot{Y}$ logic processor 200 or with the $\dot{X}$ logic processor 300. FIG. 4 shows a basic bistable circuit symbol which is used herein to represent a flip-flop circuit. The flip-flop is set by applying a "1" signal to the set (S) input which provides a "1" signal at its "1" output and a "0" signal at its "0" output. This circuit is reset by applying a "1" signal to the reset (R) terminal input thus providing a "0" signal at the "1" output and a "1" signal at the "0" output. There is no effect on the circuit if a set input signal is applied when the circuit is already set or if a reset input is applied when previously rest. It is to be understood that the principles of the invention are not to be limited to the illustrated types of flip-flops or logical operations, but other suitable types are within the scope of the invention.

FIG. 5 shows a suitable latching circuit that may be utilized in the $\dot{Y}$ and $\dot{X}$ processors of FIG. 1. A first input terminal designated by "L" is coupled to the anode terminal of a diode 201 and the cathode terminal of this diode is coupled to a circuit junction point 203. A capacitor 205 is connected between junction 203 and ground; a resistor 215 is coupled between junction 203 and ground; and the gate terminal of a suitable field effect transistor Q10 is also coupled to the junction 203. A field effect transistor Q11 has a source terminal coupled to the junction 203 and a drain terminal connected to ground. A gate terminal of the transistor Q11 is coupled to an input terminal designated by the letter "U" and this gate terminal is also connected to ground through resistor 207. The drain terminal of the transistor Q10 is connected to a suitable source of DC potential and the source terminal is coupled through a resistor 209 to ground. The source terminal of the transistor Q10 is also connected to one input of an AND circuit 211.

The second input terminal of AND circuit 211 is designated by the letter "S." In operation of the latching circuit or latching gate circuit of FIG. 5, a positive signal applied to the "L" input terminal charges capacitor 205 through the diode 201. In the absence of a signal applied to the "U" input terminal, the discharge impedance presented to capacitor 205 is extremely high and the positive charge at the junction 203 is transferred by the source follower stage, which includes transistor Q10, to the input of the AND gate 211. Upon the just described conditions, the signal pulses applied to the S input terminal of the AND gate 211 are transmitted to the output terminal 213. Upon application of a positive signal to the U input terminal, transistor Q11 conducts to provide a low impedance path for the discharge of capacitor 205. The potential at the source terminal of transistor Q10 is thereby reduced to the low level state and AND gate 211 does not pass the signals applied to the S input terminal.

Figure 6:
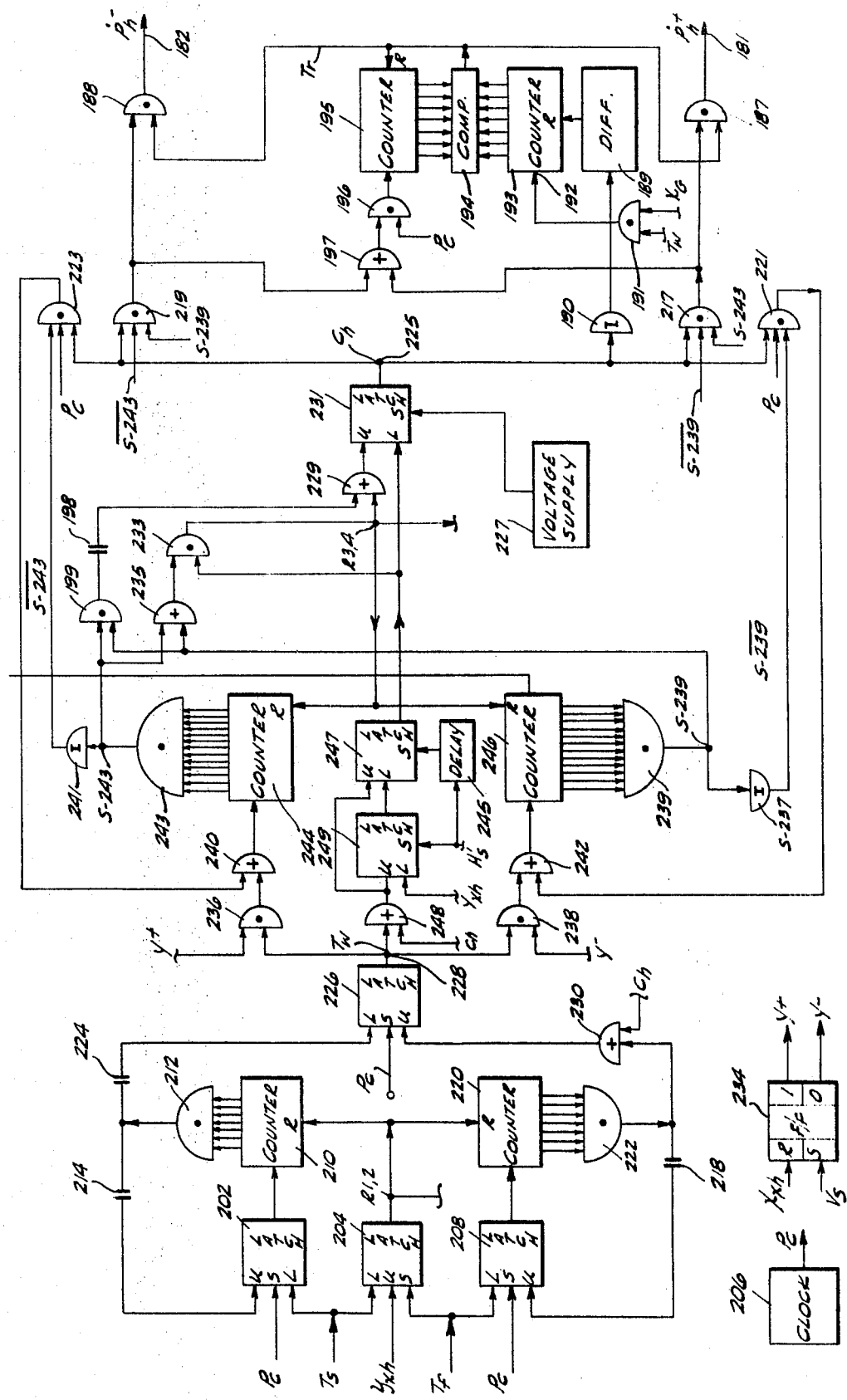
FIG. 6 is a block diagram depicting a suitable $\dot{Y}$ logic processor for the system of FIG. 1.

FIG. 6 is a block diagram of one embodiment of the $\dot{Y}$ logic processor. The signal $T_s$ which indicates the time of occurrence of the leading edge of a possible target on a particular horizontal readout scan of the TV camera 50 (FIG. 1) is applied from the terminal 174 (FIG. 2) to the L input terminals of latching circuits 202 and 204 (FIG. 6). Clock pulse signals ($P_c$) are applied from the output terminal of a suitable conventional clock circuit 206 to the S input terminal of a suitable conventional clock circuit 206 to the S input terminal of latching circuits 202 and 208. The pulse repetition frequency of the clock signal is a design parameter that may be selected for a desired degree of accuracy in a given application. A 5-megacycle per second clock frequency has been found adequate for the missile application described previously. The signal $T_f$ is applied from the terminal 176 (FIG. 2) to the S terminal of latching circuit of 204 and to the L input terminal of latching circuit 208. The signal $Y_{xh}$ is applied to the U input terminal of the latching circuit 204 from terminal 404 of gate generator 400 (FIG. 1). The first decision to be made in the $\dot{Y}$ logic processor is whether a set of signals $T_s$ and $T_f$ represent a target image that encompasses a previously stored horizontal position ($Y_{xh}$) depicted by crosshair 95 in the display of FIG. 1. Referring to the display 88 of FIG. 1, the vertical intensity line 95 is produced on each horizontal scan by the timing signal $Y_{xh}$. For the false target 94 on a given horizontal scan, the signals $T_s$ and $T_f$ will be developed without an intervening signal $Y_{xh}$. Still referring to FIG. 1, targets that encompass the vertical intensified line 95, such as targets 92, 96 and 98 of FIG. 1, will develop signals $T_s$ and $T_f$ in a sequence that has an intervening signal $Y_{xh}$. In the case of the false target 94 of FIG. 1, the signal $T_s$ latches the circuit 202 (FIG. 6) thereby allowing a counter 210 to count the clock pulses ($P_c$) applied to the S terminal of the latching circuit 202. The counter 210 may be of any suitable conventional type such as those described in the text by R.K. Richards, entitled "Arithmetic Operations in Digital Computers," 1955, published by Van Nostrand. The order (i.e., the number of bistable elements or stages) of counter 210 is dependent on the application of the system of the invention and is a function of the relative target readout time and the clock frequency. A seven-stage counter has been found adequate for the previously described missile application which incorporates a 5-megacycle per second clock rate. For the target 94 (FIG. 1) the signal $T_f$ is applied to the S terminal of latching circuit 204 prior to the occurrence of the vertical timing signal $Y_{xh}$ and therefore will develop a positive reset pulse (designated $R_{1,2}$) at an output terminal of the latching circuit 204. The signal $R_{1,2}$ is applied to a reset input terminal of the counter 210. Upon application of a reset pulse, all stages of the counter 210 are triggered or switched so that the "1" output terminal of all stages hold a "0" value and the "0" output terminals all hold a "1" value. The "0" output terminals of each stage of the counter 210 are coupled to the input terminals of an AND gate 212. When all the input signals to the AND gate 212 are at the "1" level, the output signal of the gate is switched to the "1" level. This output signal of AND gate 212 is applied through a capacitor 214 to the U input terminal of the latching circuit 202 thereby preventing the counter 210 from further counting the clock pulses applied to the S terminal of the circuit 202.

The signal $R_{1,2}$ at the output terminals of latching circuit 204 is also applied to a reset terminal of a counter 220, where the counter 220 may be of the identical configuration described for the counter 210. The zero output terminals of each stage of the counter 220 are coupled to the input terminals of a conventional AND gate 222 in a similar manner as that described for the counter 210 and the AND gate 212.

The signal at the output terminal of the AND gate 222 is applied through a capacitor 218 to a U terminal of the latching circuit 208. The just described signal unlatches circuit 208, thereby preventing the counter 220 from counting the clock pulses applied to the S terminal of the latching circuit 208. Upon the application of the reset pulse $R_{1,2}$ to counter 220 the output signal of the AND gate 222 is switched to the high level state.

For targets that do encompass the stored horizontal reference position (vertical intensified line 95, FIG. 1), such as targets 92, 96 and 98, of FIG. 1, the vertical timing signal $Y_{xh}$ is developed subsequent to the occurrence of the signal $T_s$ and prior to the occurrence of the signal $T_f$. In this case, the signal $T_s$ latches the circuit 202 and allows the counter 210 to begin a count of the clock pulse applied to the S terminal of the latching circuit 202. As described previously, the signal $T_s$ also latches the circuit 204, however, the horizontal timing signal $Y_{xh}$ is now applied to the U terminal of latching circuit 204 and unlatches it prior to the arrival of a $T_f$ pulse so as to prevent the generation of the reset pulse $R_{1,2}$. The end of target signal ($T_f$) latches circuit 208 and allows the clock pulses applied to the S terminal to be counted by the counter 220.

When the counter 210 counts to its maximum value, the next clock pulse will cause all the "1" output terminals thereof to be switched to the "0" level and all the "0" output terminals to assume the "1" level (i.e., counter 210 overflows). Upon the occurrence of this just described condition the output of the AND gate 212 will be switched to the "1" level as described previously during the reset sequence. The output signal of AND gate 212 is applied through the capacitor 214 to the U input terminal of the latching circuit 202 thereby preventing the counter 210 from further counting the clock pulses. The output of AND gate 212 is also coupled through a capacitor 224 to an L input terminal of a latching circuit 226. This signal latches the circuit 226 allowing the clock pulses applied to the S terminal thereof to be transmitted to an output terminal 228.

When the counter 220 reaches its maximum count, the next pulse will cause the "0" output terminal of each stage of the counter to be switched to the "1" level and the output terminal of the AND gate 222 will be switched to a "1" level signal value. The output signal of the AND gate 222 is transmitted by an OR gate 230 to a U input terminal of the latching circuit 226 thereby terminating the series of pulses applied to the output terminal 228. Also, as described previously, the output signal of the AND gate 222 is coupled through a capacitor 218 to the U input terminal of the latching circuit 208, thereby preventing counter 220 from receiving further clock pulses. The counter 210 commences to count at the occurrence of the signal $T_s$, and the identical configuration counter 220 commences its count at the occurrence of the signal $T_f$ and so the time period between the overflow of counter 210 and the overflow of counter 220 will be representative of the time interval between the beginning and the end of the target on a particular horizontal readout scan. The series of pulses at the output terminal 228 of the latching circuit 226 is commenced at the occurrence of the overflow of the counter 210 and is terminated at the occurrence of the overflow of the counter 220. Therefore the number of pulses applied to the terminal 228 is indicative of the width of a segment of a target that encompasses the previously stored vertical reference position ($Y_{sh}$).

The vertical sync pulses ($V_s$) is applied from the terminal 60 of TV camera 50 (FIG. 1) to a set (S) input terminal of a flip-flop circuit 234. The signal $X_{xh}$, which is representative of the time of occurrence of the stored vertical reference position, is applied from the terminal 403 of gate generator 400 (FIG. 1) to a reset terminal of the flip-flop 234. The mechanization of the circuits which generate the signal $X_{xh}$ will be described subsequently relative to the description of the gate generator 400. The signal at the "1" output terminal of the flip-flop 234 (designated $Y^+$) is at the "1" level from the start of a vertical readout frame until the occurrence of the stored horizontal position; and the "0" output terminal (designated $Y^1$) of flip-flop 234 is at the "1" level from the time of occurrence of the stored horizontal position until the start of the next vertical frame. The signal $Y^+$ is applied to an input terminal of an AND gate 236, and the signal $Y^1$ is applied to one input terminal of an AND gate 238.

The series of output pulses from the latching circuit 226 (designated $T_w$) is directed by the AND gates 236 and 238 and OR gates 240 and 242 to counters 244 or 246. The signals $Y^+$ and $Y^1$, control whether the signal $T_w$ is applied to counter 244 or 246 depending upon whether the target areas scanned were above or below the previously stored horizontal position represented by the signal $X_{xh}$.

The signal $T_w$ is also directed by an OR gate 248 to a U terminal of a latching circuit 249 which is thereby unlatched. The circuit 249 had been previously latched by the signal $Y_{xh}$, which is applied to the L input terminal from the output terminal 404 of the gate generator 400. The signal $T_w$, which unlatches the circuit 249 prevents the horizontal sync pulse $H_s$, which is applied to the S input terminal from the output terminal 58 of the TV camera 50, from appearing at the output terminal of circuit 249. The signal, at the output terminal of circuit 249 is applied to the L input terminal of a latching circuit 247. The signal $T_w$ is also applied from the OR gate 248 to a U input terminal of the latching circuit 247 to unlatch the circuits prior to the occurrence of a delayed horizontal sync signal $H_d$. The signal $H_d$ is applied to the S terminal latching circuit 247 from the output of a conventional delay circuit 245. The input of the delay circuit 245 is applied from terminal 58 of the TV camera 50 (FIG. 1). The purpose of the portion of the circuit composed of the OR gate 248 and latching circuits 247 and 249 is to determine when the $Y^1$ end of the target has been reached. Two passes in a row, that is the lack of the signal $T_w$ on two successive horizontal readout scans, is required in the embodiment described herein. However, it is understood that any numbered passes may be mechanized in accordance with the principles of the invention. The first pass is acknowledged in the latching circuit 249 and the second pass in the latching circuit 247.

The decision to be reached next is whether the target is true or false. The target is considered true if both counters 244 and 246 have received counts (the $X_{xh}$ position is contained by the target image area) at the time of the $Y^1$ end of target has been sensed.

The signal $T_w$ is transmitted by the AND gate 236 and the OR gate 240 to the input terminal of the counter 244 during the period that the readout scan of TV camera 50 is above the $X_{xh}$ reference position. The order (number of binary stages) of the counter 244 is a function of the expected target readout time duration and the clock frequency. For the missile application described previously, and a 5-m.c.p.s. clock rate, a 14-stage counter has been found adequate. The "0" output terminal of each state of the counter 244 is coupled to an input terminal of an AND gate 243. The output signal of the AND gate 243 (designated S-243) is at the "1" level when the counter is at zero count. The output signal of AND gate 243 is applied to a conventional inverter circuit 241 that develops an output signal (designated $\overline{S-243}$) which is the complement of the signal S-243 described previously. During the period that the readout scan pattern of the TV camera 50 is below the $X_{xh}$ position, the signal $T_w$ is transmitted by the AND gate 238 and the OR gate 242 to the input of the counter 246. The configuration of the counter 246 and its connection to an AND gate 239 is identical to that described for the counter 244 and the AND gate 243. The output signal of the AND gate 239 (designated S-239) is at the "1" level state when the counter 246 contains a zero count. The signal S-239 is applied to the input of a conventional inverter circuit 237 to produce a signal $\overline{S-237}$ which is the complement of the signal S-237.

The signals S-243 and S-239 are applied to the input terminal of an OR gate 235, the output of which is applied to an input terminal of an AND gate 233. The output signal of the latching circuit 247 is applied to a second input terminal of the AND gate 233 and the output signal (designated $R_{3,4}$) of the AND gate 233 is applied to reset terminals of the counters 244 and 246. Accordingly, if either counters 244 or 246 contains a zero count when the latching circuit 247 indicates that the target image has ended in the vertical direction, then the target is considered false and the counters reset.

The output signal of the latching circuit 247 is also applied to the L input terminal of a latching circuit 231 and the signal $R_{3,4}$ is transmitted through an OR gate 229 to the U input terminal of the latching circuit 231. The S input terminal of latching circuit 231 is coupled to the output terminal of a suitable positive DC (direct current) supply 227. Upon the end of the vertical scan of a possible target image, the output signal of latching circuit 247 will latch circuit 231 thereby producing a "1" level output signal (designated $C_h$) at an output terminal 225. On a false target (the $X_{xh}$ position not contained by the target image area), the signal $R_{3,4}$ is simultaneously transmitted through the OR gate 229 to the U input terminal of latching circuit 231 preventing the development of the signal $C_h$. On a true target the signal $C_h$ is developed and maintained until the end of the computation period.

The signal $C_h$ is applied through the OR gate 248 to the U input terminal of latching circuits 247 and 249 thereby preventing the occurrence of another $R_{3,4}$ pulse during the computation period. Also, the signal $C_h$ is applied to an input terminal of AND gates 223 and 221. A second input to the gating circuit 223 is the signal $\overline{S-243}$ and a third input is the clock pulses $P_c$. Upon the arrival of the signal $C_h$, the signal $\overline{S-243}$ is at the "1" level and the AND gate 223 transmits the clock pulses through the OR gate 240 to the input terminal of the counter 244. The AND gate 221 has the signal $\overline{S-239}$ applied to a second input terminal and the clock pulses $P_c$ applied to a third input terminal. Upon the occurrence of the signal $C_h$, the signal $\overline{S-239}$ is at the "1" level and the AND gate 221 transmits the clock pulses through the OR gate 242 to the input of the counter 246. The signal $C_h$ is also applied through the OR gate 230 to the U input terminal of the latching circuit 226 to ensure that a false target does not occur during the computation period.

The counter 244 will count the clock pulses transmitted by the AND gate 223 until the counter overflows, at which time the signal $\overline{S-243}$ switches to the zero level, thereby preventing the gate 223 from passing further clock pulses. In a similar manner the counter 246 will count the clock pulses transmitted by the AND gate 221 until the counter 246 overflows, resulting in the signal $\overline{S-239}$ switching to the zero level and preventing any further clock pulses from being applied through the gate 221.

The next decision to be reached is whether the target image area above the $X_{xh}$ position is larger than the area below that position, and if an unbalance exists the magnitude thereof. This decision is mechanized in a pair of AND gates 219 and 217. The gate 219 has three input signals, $C_h$, $\overline{S-243}$ and S-239, and the gate 217 has the signals $C_h$, $\overline{S-239}$ and S-243 applied to the three input terminals. If the target image above the $X_{xh}$ positions is larger, then the counter 244 will contain a higher stored count than the counter 246. The counter 244 would therefore overflow first during the computation period and the signal S-243 would be at the "1" level (counter 244 overflows) when the signal $\overline{S-239}$ is still at the "1" level (the counter 246 has not yet overflowed). Therefore the AND gate 217 would have a "1" level output signal during the time period commencing with the overflow of the counter 244 and terminating at the occurrence of the overflow of the counter 246. If the target image below the $X_{xh}$ position were larger, then the AND gate 219 would have a "1" level output signal starting at the time that the counter 244 overflows and ending with the occurrence of the overflow of the counter 246. When both the counters 244 and 246 have overflowed, (returned to the zero count condition) the signals S-243 and S-239, which are applied to the input terminals of an AND gate 199, produces a "1" level output signal at an output terminal of the gate 199. This output signal is coupled by a capacitor 198 and the OR gate 229 to the U input terminal of the latching circuit 231 thereby terminating the computation signal $C_h$.

The signals at the output terminal of the AND gates 219 and 217 are applied through an OR gate 197 to a first input terminal of an AND gate 196. A second input signal to the AND gate 196 is the clock pulses, $P_c$. Since the time duration of the signal at the output terminal of the OR gate 197 is representative of the target image area unbalance, then the number of clock pulses transmitted through the AND gate 196 to the input of a counter 195 is indicative of the vertical target area image position error.

In applications where the target image size variations are large, such as missile terminal homing guidance, tracker accuracy and stability are adversely effected if tracking response is made a function of image area. This problem may be alleviated by dividing the signal (at the output of the AND gate 196) which is representative of the area error in the vertical (height) dimension by a signal representative of the central image width. This division is mechanized in the circuitry composed of a counter 195, a comparator 194, and a counter 193. A series of pulses, the sum of which are representative of the average value of the image width, are applied from an AND gate 191 to an input terminal 192 of the counter 193 prior to the start of the computation period. The signal $T_w$ is applied from the output terminal of the latching circuit 226 to one input terminal of the AND gate 191 and is representative of the width segments of the designated target. The signal $X_G$ is applied from the output terminal 402 of the gate generator 400 to a second input terminal of the AND gate 191 and is indicative of the time of occurrence of the horizontal scan, of the TV camera 50, which occurs at the center of the designated target. The signal $X_G$ will be described in greater detail and the circuits for mechanizing the same will be explained in a subsequent portion of the specification relative to description of the gate generator 400. The output of the AND gate 191 therefore is a series of pulses the sum of which is representative of the central width of the designated target and these pulses are applied to the input terminal 192 of the counter 193. The signal $C_h$ is inverted by a conventional inverter circuit 190 and then the output thereof is differentiated by a conventional differentiator circuit 189 and then applied to a reset terminal of a counter 193. The output signal of circuit 189 resets counter 193 at the end of each computation period during each vertical readout frame and the counter 193 is then prepared to count the central image width of the designated target during the following vertical frame. The comparator 194 is coupled to counters 195 and 193 such that it senses when the count of the counter 195 reaches the value stored in the counter 193. At the time the count in the two counters are equal, the comparator 194 develops an output pulse (designated $T_r$) which is applied to a reset terminal of the counter 195 as well as to an input terminal of AND gates 188 and 187. Since a $T_r$ pulse is generated each time the counter 195 reaches the value stored in counter 193, the number of $T_r$ pulses is representative of the area error signal, applied from the output of the AND gate 196, divided by the width value stored in counter 193.

The comparator 194 may be any suitable conventional type, and one suitable comparator is shown in FIG. 7. Referring now to FIG. 7, the "1" output terminals of corresponding stages of the counters 195 and 193 are applied to the input terminals of groups of AND gates; and the "0" output terminals of corresponding stages of the counters 195 and 193 are applied to the input terminals of a second group of AND gates. For example, AND gate 186 is coupled to the "1" output terminals of the first stage of counters 195 and 193 and the "0" output terminals of the first stage of the counters 195 and 193 are coupled to the input terminals of an AND gate 185. The output signals from these two AND gates are combined in an OR gate 184. Each successive stage of the counters is connected in a similar fashion in the comparator 194 and the output of each OR gate for each stage is applied to an AND gate 183. The output of the AND gate 183 will be at the "1" level only during the time periods that all the inputs to the AND gate 183 are at the "1" level. Therefore the output of AND gate 183 will be at the one level only when the corresponding stages of the two counters 195 and 193 are in the same state, i.e., the first, second, etc. states of the counter 195 contain the same count, either a "1" or a "0," as the first, second, etc., states respectively of the counter 193.

Referring again to FIG. 6, a second input to the AND gate 188 is the output signal of the AND gate 219. In a similar manner, the output signal of the and gate 217 is applied to a second input terminal of an AND gate 187. As explained previously, the signal at the output of AND gates 219 or 217 will be at the "1" level, during the computation period, depending on whether the target image area above the $X_h$ position was larger or smaller than the target image area below the $X_{zh}$ position. Therefore, depending on the direction of the position error from the previously stored position value, either AND gate 188 or AND gate 187 will transmit the pulses $T_r$ to an output terminal 182 or 181, respectively. The signal at the terminal 182 (designated $\dot{P}_h^-$) is applied to a first signal input terminal of the Y integrator unit 250 (FIG. 1) and the signal at the terminal 181 (designated $\dot{P}_h^+$) is applied to a second input terminal of the unit 250.

Figure 8:
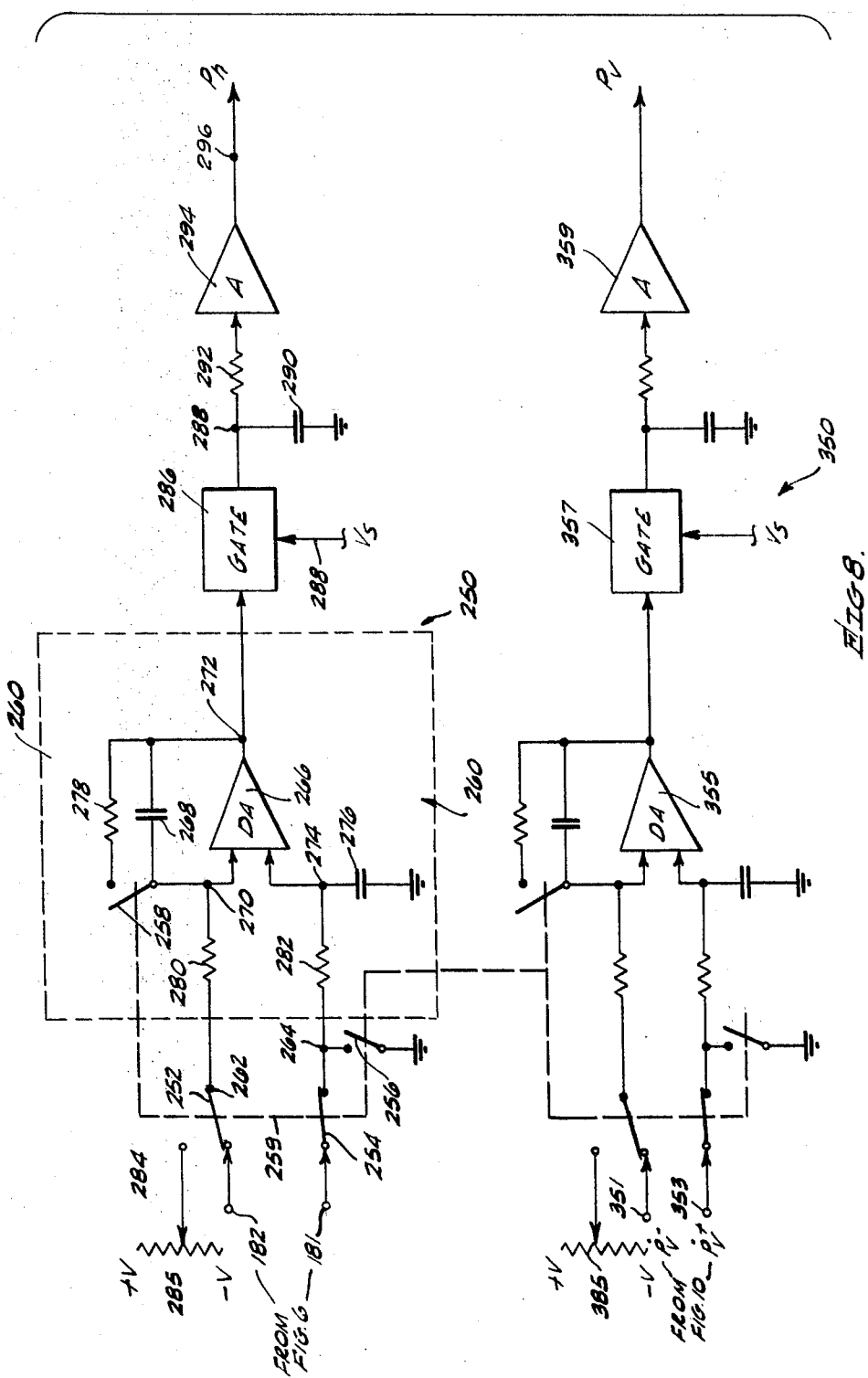
FIG. 8 is a block and schematic diagram of suitable X and Y integrator circuits for the system of FIG. 1.

A suitable mechanization for the Y integrator 250 is shown in FIG. 8. Referring now to FIG. 8, the operation of the Y integrator unit will first be described for the condition of switches 252, 254, 256 and 258 in the positions shown. The aforementioned switches may be of the conventional mechanical type interconnected by a mechanical linkage 259, for example. The signal $\dot{P}_h^-$ (from terminal 182 of FIG. 6) is applied through the switch 252 to an input terminal 262 of an integrator 260. The signal $\dot{P}_h^+$ (from the terminal 181 of FIG. 6) is applied through the switch 254 to a second input terminal 264 of the integrator 260 and the switch 256 is coupled between the terminal 264 and ground.

One suitable mechanization of the integrator 260 is as shown in FIG. 8 wherein a conventional differential amplifier 266 has a capacitor 268 coupled between a first input terminal 270 and an output terminal 272 and a capacitor 276 coupled between a second input terminal 274 and ground. A resistor 278 is connected between the output terminal 272 and the switch 258. The output potential of the integrator 260 at the terminal 272 increases in the positive direction proportional to the current supplied through a resistor 280 to the input terminal 274 and in a negative direction proportional to the current supplied through a resistor 280 to the input terminal 270. When the switches 252, 254, 256 and 258 are in the position opposite from that shown in FIG. 8, the resistor 278 is coupled across the terminals 270 and 272. Also, when the aforementioned switches are in the opposite position from that shown, the input terminal 270 is coupled through the resistor 280 and the switch 252 to a lead 284, and the terminal 274 is grounded through the resistor 282 and the switch 256. In this configuration the differential amplifier 266 operates substantially as a conventional constant multiplier operational amplifier and the output signal at the terminal 272 is proportional to the signal level on the lead 284.

The output signal at the terminal 272 is sampled and held by the circuitry composed of conventional gate 286, a capacitor 290 and a resistor 292. The gate 286 is controlled by the signals $V_s$, which is applied to an input gate terminal 288 from the output terminal 60 of the TV camera 50 (FIG. 1). The signal at the output of the integrator 260 is transmitted by the gate circuit 286, during the time of occurrence of the vertical sync signal $V_s$, to a junction 288 of the capacitor 290 and the resistor 292. The capacitor 290 is coupled between the junction 288 and ground and the potential at the junction point 288 is transmitted through the resistor 292 to an input terminal of a conventional DC amplifier 294. The output signal of the amplifier 294 (designated $P_h$) at a terminal 296 is applied to input terminal 406 of the gate generator 400 (FIG. 1). The gate generator 400 in response to the signal $P_h$ readjusts the relative timing of the signal $X_{zh}$ and therefore the relative position of the vertical tracking reference.

Figure 9:
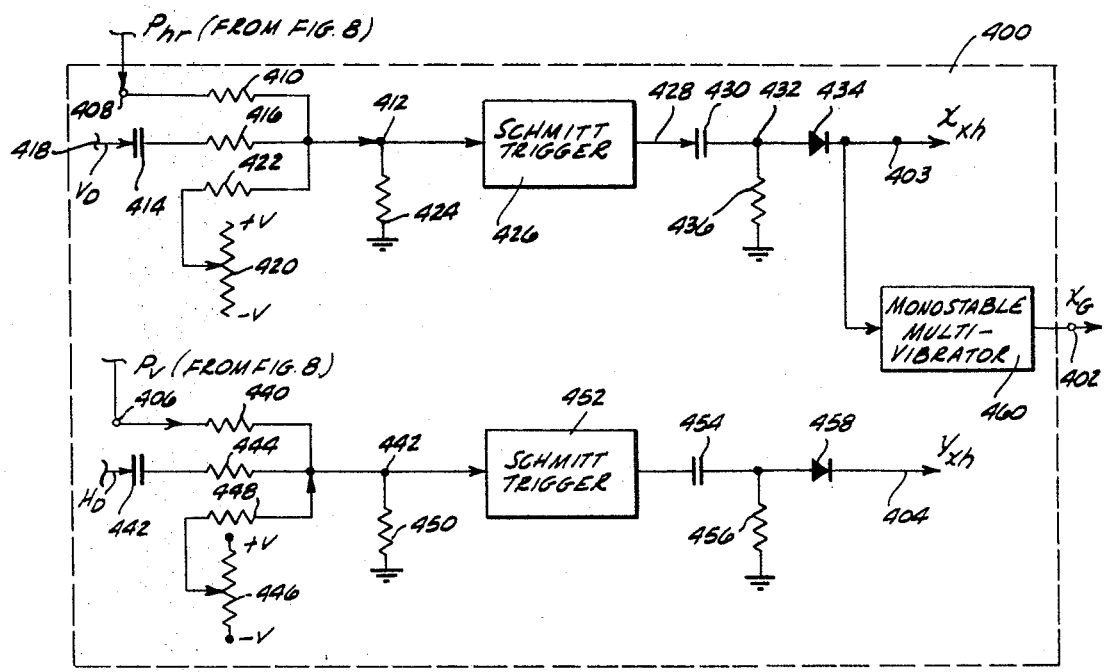
FIG. 9 is a block and circuit diagram of a suitable gate generator for the system of FIG. 1.

Reference is now directed to FIG. 9 which shows a block and schematic diagram of a circuit suitable for mechanization of the gate generator unit 400. The signal $P_h$ (from FIG. 8) which is applied to the input terminal 408 is transmitted through a resistor 410 to a summation terminal 412. The signal $V_d$ at an input terminal 418 is applied through the capacitor 414 and a resistor 416 to the summation terminal 412. The signal $V_d$ is representative of the vertical scan position of the TV camera 50 and is applied to the input terminal 418 from the output terminal 56 of TV camera 50 (FIG. 1). A calibration voltage is applied from a wiper terminal of a potentiometer 420 through a resistor 422 to the summation terminal 412. The potentiometer 420 is connected between suitable positive and negative DC voltage supplies. The aforementioned voltages, that are applied through the resistors 410, 416 and 422, are summed across a resistor 424 which is coupled between the summation terminal 412 and ground. The potential at the junction 412 is applied to a signal input terminal of a conventional Schmitt Trigger Circuit 426 and when the potential at the junction 412 exceeds a predetermined value, for example ground potential, the potential at an output terminal 428 of the Schmitt Trigger Circuit 426 changes from a low level to a high level value. The signal at the terminal 428 is applied through a capacitor 430 to a junction point 432. A resistor 436 is coupled between junction point 432 and ground and the anode terminal of a diode 434 is coupled to the junction 432 and the cathode terminal of the diode 434 is coupled to an output terminal 403. The signal at the junction 432 is the derivative of the signal at the terminal 428 and therefore a positive pulse is developed at the junction 432 at the time that the Schmitt Trigger Circuit 426 changes from the low value to the high value state. This positive pulse (designated $X_{zh}$) is transmitted by the diode 434 to the output terminal 403 and is representative of the time of coincidence, each vertical readout frame of the scan position of the center of the designated target image.

The positive pulse $X_{zh}$ also is applied to monostable multivibrator 460 which in response thereto generates the constant width gating signal $X_G$ at an output terminal 402. The time duration of the gating signal $X_G$ is to one horizontal readout scan period of the TV camera 50. As was explained previously the signal $X_G$ is utilized by display monitor 80 to produce the horizontal crosshair 93 as well as a timing signal for the X logic processor 300.

The Y processing channel that develops the signal $P_h$ which is indicative of the target image position in the vertical tracking dimension has now been described in detail. Next the X processing channel which develops the signal $P_v$ that is indicative of the target image position in the horizontal tracking dimension will be explained. As described previously, the X logic processor 300 (FIG. 1) responds to possible target start ($T_s$) and end signals ($T_f$) to produce error signals $\dot{P}_v^+$ and $\dot{P}_v^-$. These error signals are integrated by the X integrator 350 (FIG. 1) to update the vertical position signal $P_v$ at the terminal 352.

Figure 10:
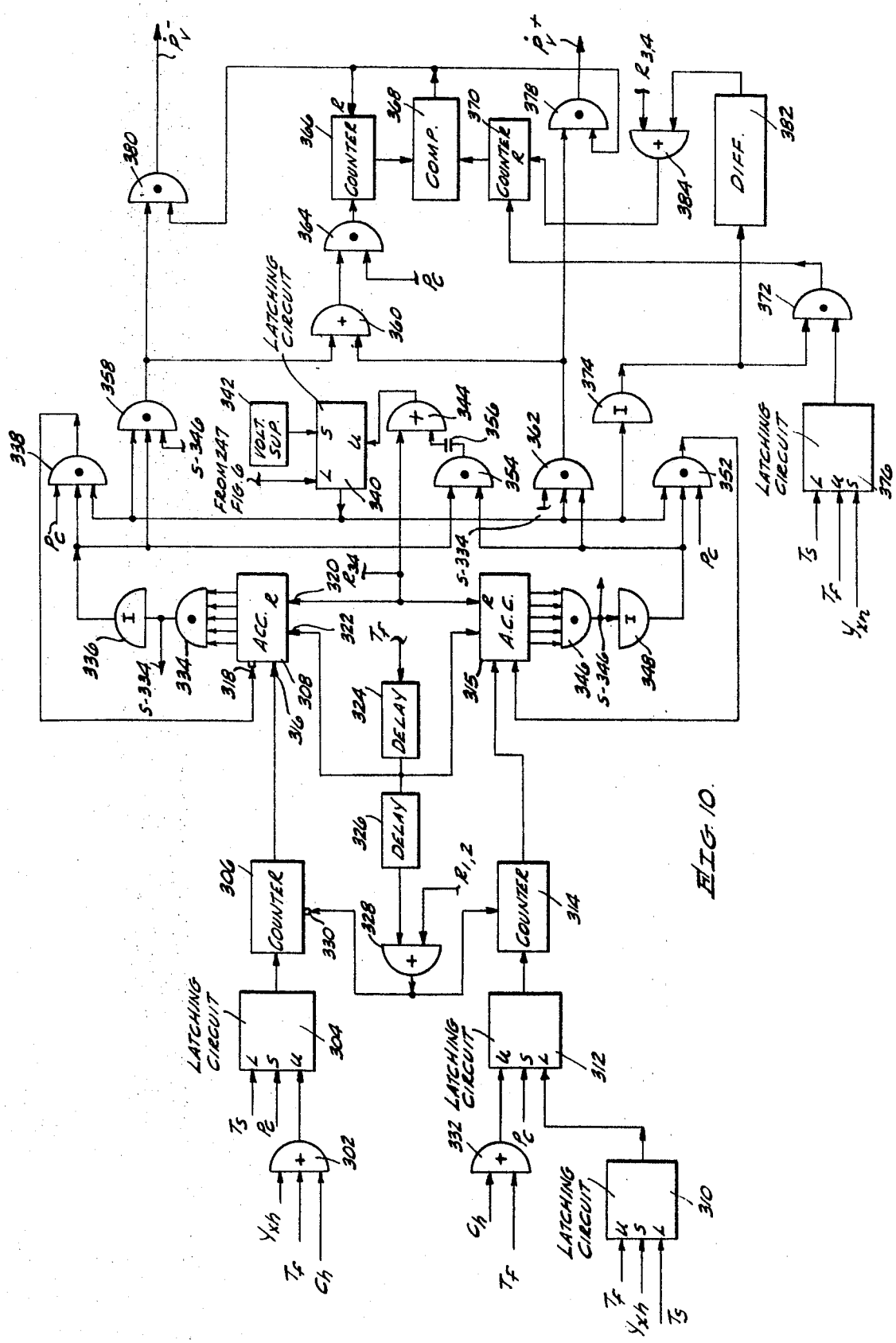
FIG. 10 is a block diagram of a suitable $\dot{X}$ logic processor for the system in FIG. 1.

A block diagram of a suitable $\dot{X}$ logic processor 300 is shown in FIG. 10. As will be evident from the following description, the functions performed by the $\dot{X}$ processor are: not to compute on target images not encompassed by the intercession of the crosshairs 95 and 93 on the display 88 (FIG. 1); to compare the area of the designated target on one side of the vertical crosshair 95 to the area on the other side thereof to derive an error signal as a function of the difference of the just stated areas; and to normalize the error signal as a function of the target image height.

Referring now to FIG. 10, the circuitry which includes an OR gate 302, a latching circuit 304, a counter 306, and an accumulator 308 computes the area of the designated target image on one side of the vertical position as represented by the vertical crosshair 95 (FIG. 1). The circuitry which includes the latching circuits 310 and 312, a counter 314 and an accumulator 315 computes the designated target area on the opposite side of the vertical position. The signal $Y_{xh}$ is applied from the output terminal 404 of the gate generator 400 (FIG. 1) to one input terminal of the OR gate 302. The signal $T_f$ is applied from the output terminal 176 (FIG. 2) to a second input terminal of the OR gate 302 and the signal $C_h$ is applied from terminal 225 (FIG. 6) to the third input terminal of the OR gate 302. The output signal from the OR gate 302 is applied to a U input terminal of the latching circuit 304. The signal $T_s$ is applied from the output terminal 174 (FIG. 2) to an L input terminal of the latching circuit 304 and the clock pulses $P_c$ are applied from the output terminal of the clock 206 (FIG. 6) to an S input terminal of latching circuit 304. The counter 306 counts the clock pulses transmitted by the latching circuit 304 and is coupled to the accumulator 308. The accumulator 308 may be of the type described in the previously cited R.K. Richards text entitled "Arithmetic Operations in Digital Computers" and includes two signal input terminals 316 and 318, an add pulse command input terminal 322, and a reset input terminal 320. Upon the application of an add pulse to terminal 322 the accumulator adds the binary word which is stored in counter 306 to the previously stored sum. The accumulator 308 adds the pulses that are applied to the terminal 318 in a serial manner without the requirement for the presence of an add pulse. Upon the transmittal of a reset pulse to the terminal 320 all stages of the accumulator are reset to the zero state. The signal $T_f$ after being delayed in the conventional delay circuit 324 is applied to the add input terminal 322 of the accumulator 308 to serve as the add pulse for the accumulator 308 and the delayed pulse, generated by the delay circuit 324, is further delayed in a conventional delay circuit 326 and then transmitted through an OR gate 328 to the reset terminal 330 of the counter 306. A second input signal to the OR gate 328 is the reset pulse $R_{1,2}$ which is applied from the output terminal of the latching circuit 204 of FIG. 6.

The signals $T_f$, $Y_{xh}$ and $T_s$ are applied to the U, S and L input terminals respectively, of the latching circuit 310 and the output thereof is coupled to the L input terminal of the latching circuit 312. The signals $T_f$ and $C_h$ are combined in the OR circuit 332 and then applied to a U input terminal of the latching circuit 312. The clock pulses $P_c$, which are applied to the S input terminal of the latching circuit 312, are counted in the counter 314 and then subsequently accumulated in an accumulator 315. The reset function of the counter 314 as well as the add and reset function of the accumulator 315 are identical to those described for the counter 306 and the accumulator 308, respectively.

The zero output terminals of each binary stage of the accumulator 308 are coupled to the input terminal of an AND gate 334 and the output terminal of the AND gate 334 is inverted in an inverter 336 and then applied to a first input terminal of an AND gate 338. A second input to the AND gate 338 is the clock pulses generated by clock 206 (FIG. 6) and a third input thereto is the output signal from a latching circuit 340. The signal at the output terminal of the latching circuit 247 (FIG. 6) is applied to an L input terminal of the latching circuit 340, a constant voltage applied by voltage supply 342 is applied to the S input terminal, and a U input terminal of the latching circuit 340 is coupled to the output terminal of an OR gate 344. The signal at the output terminal of the latching circuit 340 is at the one level immediately following the end of the target's image in the vertical direction of the readout scan of the sensor 50 (FIG. 1). On the occurrence of a high level signal at the output of the latching circuit 340, and if the count in the accumulator 308 is not at the zero count, then the AND gate 338 transmits the clock pulses to the input terminal 318 of the accumulator 308. In response to the pulses transmitted through the AND gate 338 the accumulator 308 serially counts the clock pulses until its maximum count is reached at which point it overflows and returns to the zero count. The signal at the output of the inverter 336 will then switch to the low level state and interrupt the transmission of the clock pulses to the terminal 318.

The function and mechanization of the accumulator 315, AND gate 346, inverter 348 and an AND gate 352 are identical to that just described for accumulator 308, AND gate 334, inverter 336 and AND gate 338, respectively, and in the interest of simplicity will not be described further herein. The output signal from the inverter 336 is applied to a first input terminal of an AND gate 354 and the output signal from the inverter 348 is applied to a second input terminal of the AND gate 354. The output signal of the AND gate 354 is coupled through a capacitor 356 to a first input of the OR gate 344 and the signal $R_{3,4}$ from the AND gate 233 of FIG. 6 is applied to the second input terminal of the OR gate 344.

The function of the latching circuit 340 in conjunction with the OR gate 344 is to indicate when the end of the target image has occurred in the vertical direction and to control the AND gates 338 and 352 so as to start the accumulators 308 and 315, respectively, counting towards overflow. The AND gate 354 senses when both accumulators 308 and 315 have overflowed at which point latching circuit 340 interrupts the pulses transmitted to the accumulators through the AND gates 338 and 352.

The output signal of the latching circuit 340 is applied to a first input terminal of an AND gate 358, the output signal from the inverter 336 is applied to a second input terminal and the signal at the output terminal of the AND gate 346 (designated S-346) is applied to a third input terminal. The output signal from the AND gate 358 is applied to a first input terminal of an OR gate 360. The second input terminal applied to the OR gate 360 is generated by an AND gate 362. The AND gate 362 has a first input signal which is applied from the output of the AND gate 334 (designated S-334). The signal from the output terminal of the latching circuit 340 is applied to the second input terminal of the AND gate 362 and the output signal from the inverter 348 is applied to a third input terminal of the AND gate 362.

An AND gate 364 has a first input terminal coupled to the output terminal of the OR gate 360 and a second input terminal to which the clock pulses from the clock 206 (FIG. 6) are applied. The output of the AND gate 364 is counted in a counter 366 which is coupled to a comparator 368 which in turn is coupled to a counter 370. The mechanization and function of the counter 366, comparator 368 and counter 370 are identical to that described previously for counter 195, comparator 194, and counter 193, respectively, relative to the discussion of FIG. 6.

The counter 370 counts the pulses applied from the output terminal of an AND gate 372 which has the signals developed by the output circuit of an inverter 374 as one input signal and the signal developed at the output terminal of a latching circuit 376 as a second input signal. The latching circuit 376 has the signal $T_s$ applied to an L input terminal, the signal $T_f$ applied to a U input terminal and a signal $Y_{xh}$ applied to the S input terminal thereof and the inverter 374 has its input terminal coupled to the output terminal of the latching circuit 340. The sum of the series of pulses there are counted by counter 370 are indicative of the height of the designated target image and the output signal of the comparator 368 is indicative of the error in the balance in the horizontal direction of the target image relative to the vertical crosshair 95 ($Y_{xh}$).

The output signal of the comparator 368 is applied to the reset terminal of the counter 366 as well as to one input terminal of a pair of AND gates 378 and 380. The second input signal to the AND gate 380 is the output of the AND gate 358 which is at the high level state if the area unbalance of the target image is on one side of the vertical crosshair 95 (FIG. 1). A second input to the AND gate 378 is applied from the AND gate 362 which is at the one level if the area unbalance of the target image is on the opposite side of the vertical crosshair 95.

The output signal from the inverter 374 is applied through the conventional differentiator 382 and then to a first input terminal of an OR gate 384. A second input to the OR gate 384 is the signal $R_{3,4}$ which is applied from the output of the AND gate 233 (FIG. 6). The output signal from the OR gate 384 is applied to a reset terminal of the counter 370.

In operation, the $\dot{X}$ logic processor of FIG. 10 counts clock pulses so that the number thereof is indicative of the target's image area on alternate sides of the vertical crosshair 95 (FIG. 1). For example the counter 306 of FIG. 10 counts the target image area on one side of the vertical crosshair 95 which occurs between the signal $T_s$ (which is indicative of the start of the target's image) and the signal $Y_{xh}$ which is indicative of the position of the vertical crosshair 95. The counter 314 counts the number of pulses, indicative of the target image area on the opposite side of the vertical crosshair 95, that occur after the time of occurrence of the vertical crosshair signal $Y_{xh}$ and before the time of occurrence of the signal $T_f$ (which indicates the end of the target's image on a particular horizontal readout scan of the TV camera 50). For targets which are not intersected by the vertical crosshair 95, the counters 306 and 314 are reset by the signal $R_{1,2}$ and their inputs are not accumulated by accumulators 306 and 315 and therefore do not affect the tracking response of the system in accordance with this invention. For targets whose image do intersect the vertical crosshair 95, the areas on opposite sides of the crosshair 95 are counted by counters 306 and 314 and at the end of the target image on a given horizontal readout scan the count stored in the counters 306 and 314 are added to the total that has been accumulated in accumulators 308 and 315, respectively. The values stored in the counters are shifted into the accumulators in response to an add signal which is generated from the signal $T_f$ after a suitable delay has been added thereto. Also, the add signal after further delay is applied to reset the counters so that they may count the target image area on the next horizontal scan. Accumulators 308 and 315 continue to store the signals indicative of the total area of the target's image on opposite sides of the vertical crosshair 95 until one of two possibilities occur. First, for targets such as target 96 of FIG. 1, where the target's image on the screen 88 is intersected by the vertical crosshair 95 but not by the horizontal crosshair 93, a signal $R_{3,4}$ senses this condition and resets accumulators 308 and 315. However, for a valid designated target such as that shown by image 92 on the screen 88 of FIG. 1, the latching circuit 340 indicates when the vertical end of the target has been scanned. As was explained previously, this indication is determined by sensing two successive horizontal readout scans during which time no valid target video has been detected. Upon indication that the target's image has ended in the vertical direction the latching circuit 340 generates a positive output signal which is applied to the AND gates 338 and 352 and in response thereto these gates begin to count the accumulators 308 and 315 to the overflow condition in a manner similar to that explained previously for the $\dot{Y}$ logic processor 200.

The remaining logic structure of the $\dot{X}$ logic processor 300 is functionally similar to that previously described for the $\dot{Y}$ logic processor 200. The AND gates 358 or 362 allow clock pulses to pass for a time interval proportional to the area unbalance of the target's image relative to the vertical crosshair 95. The circuit composing latching circuit 376 and the AND gate 372 computes the relative central target image height and stores this value in the counter 370. A series of pulses which are indicative of the area unbalance of the designated target and are serially counted into the counter 366 are compared in the comparator 368 with the height dimension that has previously been stored into the counter 370. Each time the count in the counter 366 reaches the value stored in the counter 370 the comparator circuit generates an output pulse which resets the counter 366 and which is applied to the steering output AND gates 378 and 380. It should be noted that in the embodiment shown, only one measurement of target height and width is utilized. However, it will be obvious to those skilled in the art that an average value of these parameters may be obtained and slaved in the counters 370 and 193 (FIG. 6). The AND gates 378 and 380 are so mechanized that the output pulses are transmitted only through one gate and the gate selected for this transmission is determined by which side of the vertical crosshair 95 that the area unbalance is on. The series of pulses at the output terminal of the AND gate 380 have been designated $\dot{P}_v^-$ and the output signal and the AND gate 378 designated $\dot{P}_v^+$.

The signals $\dot{P}_v^-$ and $\dot{P}_v^+$ are applied to the X integrator 350 and utilized therein to update the signal $P_v$ which through the generator 400 controls the position of the vertical crosshair 95 (signal $Y_{xh}$) and which is indicative of the horizontal position of the target center relative to the field of view of the TV camera 50. Referring now to FIG. 8 which shows one suitable embodiment of the X integrator 350, the signal $\dot{P}_v^-$ is applied from the output of the $\dot{X}$ logic processor (FIG. 10) to an input terminal 351 of the X integrator 350 and the signal $\dot{P}_v^+$ is applied to an input terminal 353 of the X integrator. The mechanization and interconnection as well as the functional utilization of the differential amplifier 355, the electronic gate 357 and the amplifier 359 are identical to that previously described for the differential amplifier 266, the electronic gate 286, and the amplifier 294 of the Y integrator 250 which was described previously, therefore, in the interest of simplicity, it will here just be noted that the error signals developed in the output terminals of the $\dot{X}$ logic processor 300 are processed by the X integrator so as to update the signal $P_v$.

The gate generator unit 400 (FIG. 9) in response to the signal $p_v$, develops the signal $Y_{xh}$ in a manner similar to that described for the signals $P_h$ and $X_{xh}$. Referring now to FIG. 9, the signal $p_v$ is applied through a resistor 440 to a summation point 442 and the signal $H_d$ from terminal 54 of FIG. 1 is applied through a capacitor 442 and a resistor 444 to the summation point 442. Also, the potential at a wiper terminal of potentiometer 446 is applied through a resistor 448 to the summation point 442. The potentiometer 446 is coupled between suitable positive and negative DC voltage supplies. A summation resistor 450 is connected between terminal 442 and ground and the potential at the terminal 442 is a sum of the voltages applied through resistors 440, 444, and 448. The circuits composed of a Schmitt Trigger unit 452, a capacitor 454, a resistor 456 and diode 458 are mechanized and function in a similar manner to that described previously for elements 426, 430, 436 and 434, respectively. The positive pulse transmitted through the diode 458 ($Y_{xh}$) represents the time occurrence, during the horizontal readout scan pattern of the TV camera 50, that the readout beam is coincident with the position represented by the voltage $P_h$.

Tracking of a designated target with the system of FIG. 1 is initiated by the operator manually positioning the switches shown in FIG. 8 to the opposite position from that there shown. In this mode of operation, the voltages $P_h$ and $P_v$ are controlled by the position of the wipers of potentiometers 285 and 385, respectively. By means of controlling the aforementioned potentiometers, the operator may position the crosshairs 93 and 95 of the display 88 (FIG. 1) such that the intersection of these crosshairs is within the image of the desired target. After the operator has designated the object to be tracked by the acquisition procedure just described, the automatic track mode is initiated by manually returning the switches of FIG. 8 to the position there shown.

In this track mode of operation, the intersection of the crosshairs will continually track the approximate center of the target image on the display 88 (FIG. 1) and the voltages $P_h$ and $P_v$ will be representative of the vertical and horizontal center, respectively, of the designated target in the coordinate system of the sensor (TV camera 50).

Figure 11:
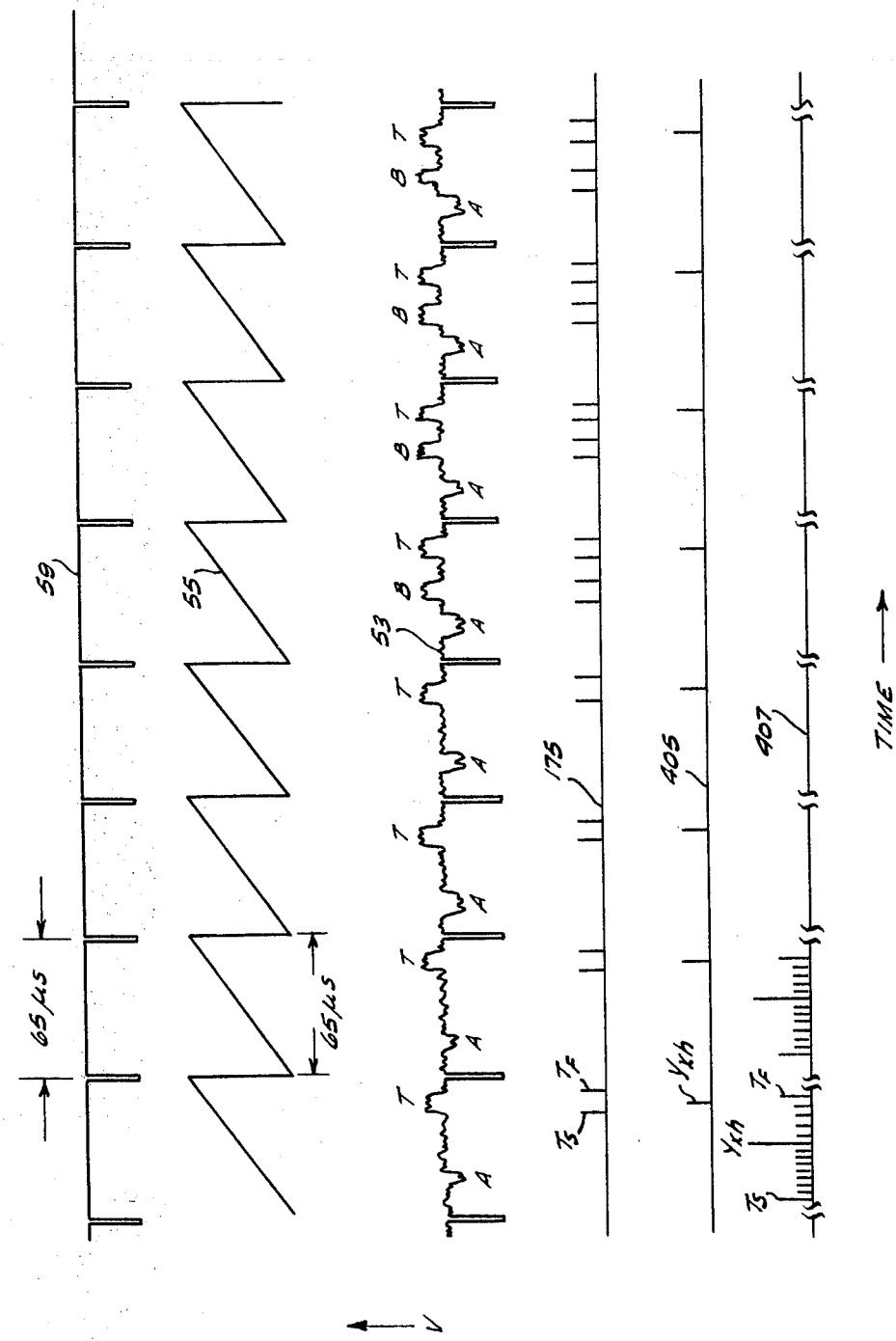

The mechanization and operation of the system in accordance with the principle of the invention may be clarified by a discussion of the timing and logic sequences of the system of FIG. 1. It should be noted that although a conventional TV timing sequence has been selected for this preferred embodiment, that any suitable time base may be utilized in accordance with the principles of the invention. Referring NOW TO FIG. 11, a waveform 59 shows a representative series of horizontal sync pulses ($H_s$) which are developed by the TV camera 50 and which provide horizontal synchronization for the $\dot{Y}$ logic processor. A waveform 55 shows a series of horizontal deflection signals ($H_d$) which are generated by the TV camera 50 and which are utilized to control the horizontal scan pattern of the TV monitor 80 as well as provide the horizontal timing reference for the gate generator 400.

The amplitude variations of the video signal applied from the terminal 52 of the TV camera 50 are shown by the waveform 53 of FIG. 11. By way of illustration, it may be assumed that the positive peaks, designated by the letter "T", corresponds to a designated target image such as 92 (FIG. 1); that the positive peaks designated by the letter "B" correspond to signals from a false target such as image 94; and that the negative peaks designated by the letter "A" are representative of terrain return images (90, FIG. 1). As will be recalled from the discussion of the mechanization of video processor 100 relative to FIG. 2, $T_s$ pulses are applied to the terminal 174 coincident with the leading edge of the video signals of substantially the same amplitude as that of the designated target. Also, the $T_f$ pulses are applied at a terminal 176 (FIG. 2) coincident with the trailing edge of the video signals of substantially the same amplitude as the designated target. This function of the video processor unit 100 is depicted by a waveform 175 of FIG. 11 where a pair of $T_s$, $T_f$ pulses are shown for each portion of the waveform labeled by the letter "T" and "B", but not for the portion of the waveform labeled "A". Thus, it is shown that the video processor unit 100 converts analog video signals into digital timing signals based on an amplitude comparison.

The $\dot{Y}$ and $\dot{X}$ logic processors discriminate between the designated target video and false target signals on the basis of target position or location. A waveform 405 of FIG. 11 shows the relative timing of the horizontal reference timing signal $Y_{xh}$ applied at the terminal 404 of FIG. 1 and as shown by a waveform 407, a true target signal pair will contain a $Y_{xh}$ pulse between the time of occurrence of the $T_s$ and $T_f$ pulses. The waveform 407 shows portions of the waveform 175 at an expanded time scale with the addition of the clock timing pulses. In effect, the $\dot{X}$ processor determines the relative horizontal position of the target by counting the number of clock pulses to the left of the $Y_{xh}$ signal and compares that count to the number of clock pulses to the right of $Y_{xh}$ signal.

Figure 12:
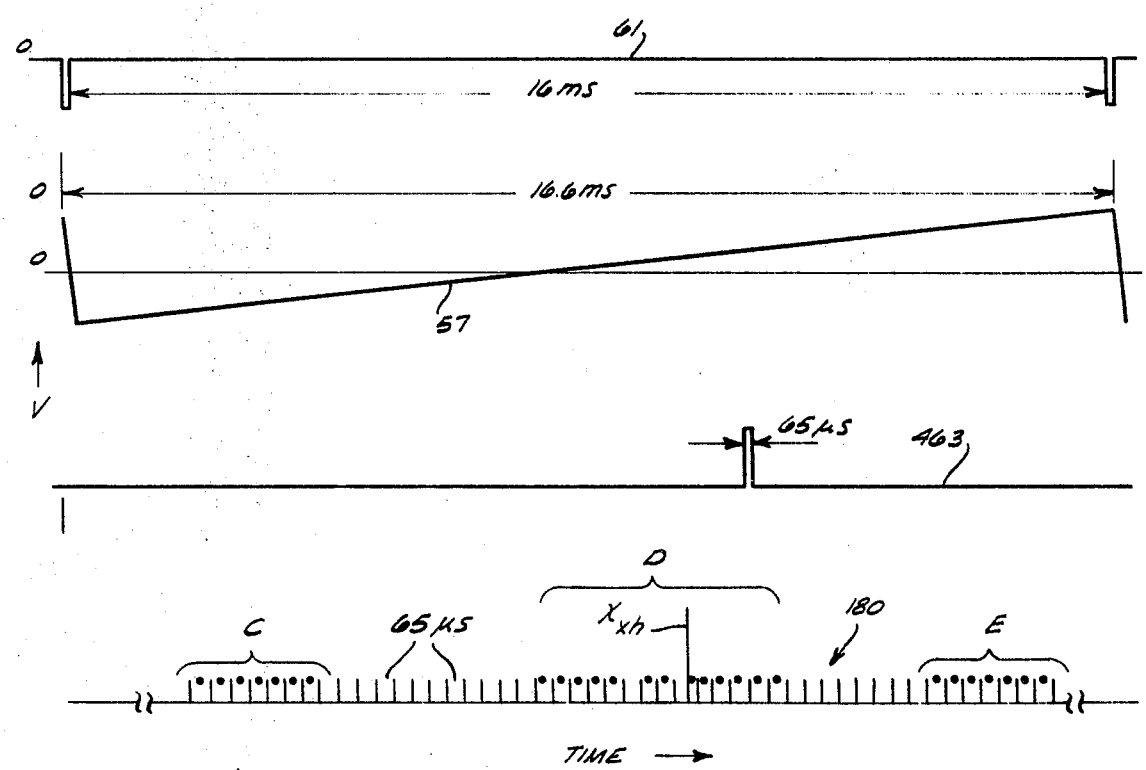
FIGS. 11 and 12 are diagrams of voltage vs. time waveforms for explaining the operation of the system in accordance with the invention.

The timing sequence of the vertical sync pulse ($V_s$) produced by the TV camera 50 are shown by a waveform 61 of FIG. 12. These pulses control the vertical synchronization of the logic processor and integrator units of FIG. 1. A waveform 57 shows the vertical deflection signal ($V_d$) applied at the terminal 56 of FIG. 1. This deflection signal controls the vertical scan sequences of the TV monitor 80 as well as provides a vertical timing reference for the gate generator 400. The relative timing of the horizontal crosshair intensified gate signal ($X_G$) which is developed at the terminal 402 (FIG. 1) is shown by a waveform 463 of FIG. 12.

It will be recalled from the discussion of the mechanization for the $\dot{Y}$ and $\dot{X}$ logic processors that after it has been determined that a possible target signal brackets the $Y_{xh}$ timing reference signal, that it then must be verified that the target encompasses the vertical reference position ($X_{xh}$). This decision is made on the basis of an examination of the target validity on successive horizontal scans. Referring to the display screen 88 of FIG. 1, images 96 and 98 will develop $T_s$ and $T_f$ pulses with intervening $Y_{xh}$ reference timing signals, but it will be noted that the signals corresponding to the image 96 are terminated prior to the time of occurrence of the vertical reference position and that the signals corresponding to the image 98 are not developed until after the time of occurrence of the vertical reference position. Consequently, only the image of the designated target, 92, provides possible target signal pairs prior to and after the time of occurrence of the $X_{xh}$ reference position and it is this fact that is utilized in the mechanization of the logic processors to distinguish targets of the same intensity but that are separated in vertical position. This logic sequence is illustrated by a waveform 180 of FIG. 12 which shows a portion of a vertical scan sequence. Horizontal readout scan periods are indicated and for purposes of illustration those that are labeled by a dot represent the scan periods that contain possible target signals which encompass the horizontal reference position ($Y_{xh}$). For example, the series of horizontal scan periods designated by the letter "C" could correspond to the image 96 (FIG. 1), those designated by the letter "D" could correspond to the true target image 92 and those labeled "E" to the image 98. As explained previously, only the series of horizontal scan periods which correspond to the designated target encompass the vertical reference position ($X_{xh}$) and only these signals are processed by the $\dot{Y}$ and $\dot{X}$ processors.

The tracking system in accordance with the principles of the invention may be utilized in such applications as target detection and armament control or for missile guidance in air-to-air, ground-to-air or ground-to-ground missiles. For example the system of FIG. 13 shows a homing missile terminal guidance system incorporating the principles of the invention. The operator may select the object to be tracked by utilizing the acquisition and track procedure described previously. The tracking system of FIG. 1 exclusive of the TV camera 50 and the TV monitor 80, is designated unit 501 in FIG. 13. In response to the video and deflection signals of the TV camera 50, the tracker unit 501 provides output voltage $P_h$ and $P_v$ at terminals 503 and 505 which represent the approximate vertical and horizontal centers, respectively, of the target image relative to the TV camera field of view. These signals $P_v$ and $P_h$ may be utilized by any suitable conventional missile terminal guidance system to direct the flight path of the missile after launch. For example, referring to FIG. 13 the elevation tracker reference potential $P_h$ at the terminal 503 is processed by a conventional electronic servomechanism control amplifier 507 and then coupled on a lead 509 to a conventional gyroscope torquer unit 510. The free gyroscope unit 519 is mechanically precessed by the action of the torque unit 510. The gyroscope unit 519 may be of any suitable conventional type such as that shown in FIG. 10-5(a) page 272 of the text entitled, "Guided Missile Engineering" published by McGraw-Hill Book Company, New York. The force exerted by the torquer unit 510 is such as to precess the gyroscope in the elevation angular direction thereby changing the field of view of the TV camera 50, which is physically attached to the gyroscope unit 519. The resulting angular motion of the TV camera tends to point the optical axis more towards the vertical position of the designated object, therefore resulting in a decrease of the elevation tracker reference potential at the terminal 503.

In a similar manner the azimuth tracker reference potential $P_v$ at a terminal 505 is processed by a conventional electronic servomechanism control amplifier 511 and is then coupled on a lead 513 to a conventional gyroscope torquer unit 514. The force exerted by the torquer unit 514 is such as to precess the gyroscope 519 in the azimuth angular direction and thereby change the field of view of the TV camera 50. The resulting angular motion of the TV camera tends to point the optical axis more towards the horizontal position of the designated object, resulting in a decrease in the azimuth tracker reference potential at the terminal 505.

Also the elevation tracker reference potential at the terminal 503, $P_h$ is coupled on a lead 515 to a suitable conventional missile elevation control system 521. In response to the signal $P_h$ the system 521 mechanically drives the missile elevation control surfaces 525. This outer servocontrol loop, which is closed by control surfaces 525, tends to null the line of sight angle of the designated object with respect to the missile velocity vector.

In a similar manner, the tracker azimuth reference potential at the terminal 505 is coupled on a lead 517 to a suitable missile azimuth control system 527 which drives the missile azimuth control surfaces 531 and thereby closes the outer servo loop in the horizontal direction.

It is to be noted that the frequency response of the servo loop comprising the TV camera 50 and tracker system 501 is usually much higher than that of the control loop for positioning the camera 50 and gyroscope 519 combination and that the servo loop controlling the missile steering surfaces conventionally possesses the longest time response.

Although but one embodiment of this invention has been described herein, it will be appreciated by those skilled in the art that other arrangements may be utilized in accordance with the principles of this invention. For instance, target tracking normalization may be accomplished by utilizing average target height and width values rather than the central values described herein. Also, since the principles of this invention are unaffected by the spectral band of the sensor element, any suitable sensor, for example, infrared or ultraviolet types may be used instead of the TV camera. Although in the illustrated system the target is tracked in two dimensions, it is to be understood that the principles of the invention include systems operating in one or two dimensions. Further, it is noted that the term space is to include any portion of the atmosphere or of outer space.

Thus, there has been described a tracking system that determines the location of a designated object relative to the field-of-view of a sensor. The system produces improved tracking accuracy and stability over large variations of target images and reduces the effects of false targets of different intensity levels or angular position.

What we claim is:

1. A system for determining the location of a designated object in response to energy received from a sector of space, comprising:

sensor means for producing signals which are amplitude representative of the relative intensity of the received energy;

acquisition means coupled to said sensor means and responsive to the sensor signals for determining the approximate location of a designated object;

storage means coupled to said acquisition means for storing the approximate location of the designated object;

logic means responsive to the sensor signals for distinguishing the designated object from other objects by a comparison of the location of the objects to the stored approximate location of the designated object;

digital processor means coupled to said logic means and being responsive to the sensor signals corresponding to the designated object for determining the difference between the location of the designated object and the stored location;

and updating means, coupled to said digital processor means and said logic means, for updating the stored approximate location of the designated object, said updating means including means, coupled to said logic means and responsive to the sensor signals corresponding to the designated object, for determining the relative area of the designated object, and means, coupled to said area determining means and to said digital processor means, for updating the stored approximate location of the designated object as a function of the relative area of the designated object.

2. A system for determining the location of a designated object in response to energy received from a sector of space, comprising:

sensor means for producing signals which are amplitude representative of the relative intensity of the received energy;

acquisition means coupled to said sensor means and responsive to the sensor signals for determining the approximate location of a designated object;

storage means coupled to said acquisition means for storing the approximate location of the designated object;

logic means responsive to the sensor signals for distinguishing the designated object from other objects by a comparison of the location of the objects to the stored approximate location of the designated object;

digital processor means coupled to said logic means and being responsive to the sensor signals corresponding to the designated object for determining the difference between the location of the designated object and the stored location;

and updating means, coupled to said digital processor means and said logic means, for updating the stored approximate location of the designated object, said updating means including first means, coupled to said logic means and responsive to the sensor signals corresponding to the designated object, for determining the relative dimensions of the designated object, and second means, coupled to said dimension determining means and to said digital processor means, for updating the stored approximate location of the designated object as a function of the relative dimensions of the designated object.

3. A system for determining the location of a designated one of a plurality of objects in response to energy received from a sector in space, comprising:

sensor means, for producing signals which are amplitude representative of the relative intensity of the received energy;

acquisition means coupled to said sensor means and responsive to the sensor signals for determining the approximate location of a designated object;

means, coupled to said acquisition means and to said sensor means, for storing a signal which is amplitude representative of the received energy intensity of the designated object;

a video processor, coupled to said sensor means and said signal storage means, for distinguishing objects of approximately the same energy intensity as the designated object from other objects, by an amplitude comparison of the sensor signals to the stored signal representative of the energy intensity of the designated object;

means, coupled to said acquisition means, for storing the approximate location of the designated object;

logic means, coupled to said video processor and said location storage means and responsive to the sensor signals corresponding to objects of approximately the same energy intensity as the designated object, for distinguishing the designated object by a comparison of the location of the objects to the stored approximate location of the designated object;

digital processor means, coupled to said logic means and responsive to the sensor signals corresponding to the designated object, for determining the difference between the location of the designated object and the stored location;

and updating means, coupled to said digital processor means, and to said location storage means for updating the stored approximate location of the designated object.

4. The system as set forth in claim 3, wherein said logic means includes means for distinguishing the designated object from other objects by determining which object encompasses the stored reference location.

5. The system as set forth in claim 3, wherein said digital processor means includes:

means, coupled to said logic means, for generating series of digital signals that represent increments of area of the designated object;

means, coupled to said digital signal generator means, for counting the number of digital signals on opposite sides of the stored reference location;

and means, coupled to said counting means, for generating a series of digital pulses which represent the difference in the number of digital signals counted on opposite sides of the stored reference location.

6. The system as set forth in claim 3, in which said updating means comprises:

means, coupled to said logic means and responsive to the sensor signals corresponding to the designated object, for determining the relative area of the designated object;

and means, coupled to said area determining means and to said digital processor means, for updating the stored approximate location of the designated object as a function of the relative area of the designated object.

7. The system as set forth in claim 3, in which said updating means comprises:

means, coupled to said logic means and responsive to the sensor signals corresponding to the designated object, for determining the relative dimensions of the designated object;

and means, coupled to said dimension determining means and to said digital processor means, for updating the stored approximate location of the designated object as a function of the relative dimensions of the designated object.

8. A system for tracking the location in first and second orthogonal coordinates, of the center of a designated one of a plurality of objects, in response to energy received from a sector in space, comprising:

sensor means, responsive to energy received from a sector in space including the designated object, for sequentially scanning increments of area of the sector in space and developing area signals that are amplitude representative of the relative intensity of the increments of area;

acquisition means, coupled to said sensor means, for generating first and second coordinate positions that are representative of the approximate location of a designated object;

means coupled to said acquisition means for storing the first coordinate position;

means coupled to said acquisition means for storing the second coordinate position;

video processor means, coupled to said sensor means and said acquisition means and responsive to the area signals for developing first and second timing signals that are indicative of the time occurrence, relative to the sensor scan sequence, of area signals of a selected amplitude level;

logic means, coupled to said video processor means and to said first and second coordinate storage means and responsive to timing signals, for developing digital area signals representative of area increments of only those objects in continuity with the designated object;

digital processor means, coupled to said logic means and to said first and second coordinate storage means and responsive to said digital area signals, for developing first and second digital position difference signals representative of the difference between the location of the designated object and the first and second stored coordinate positions respectively;

and updating means, coupled to said digital processor means and to said first and second coordinate storage means and responsive to first and second digital position difference signals, for updating the stored coordinate positions to represent the location of the designated object.

9. The system as set forth in claim 8 in which said video processor means includes:

sampling means coupled to said acquisition means and said sensor means for developing a signal which is amplitude representative of the received energy intensity of the designated object;

means, coupled to said sampling means, for storing a signal which is amplitude representative of the received energy intensity of the designated object;

means, coupled to said signal storage means and to said sensor means, for distinguishing objects of approximately the same energy intensity as the designated object from other objects by an amplitude comparison of the sensor signals to the stored signal representative of the energy intensity of the designated object;

and means, coupled to said amplitude comparison means, and responsive to the area signals for developing first and second timing signals that are indicative of the time occurrence, relative to the transducer scan sequence of objects of approximately the same energy intensity as the designated object.

10. A system as set forth in claim 8 in which said logic means includes:

first logic gating means, coupled to said sensor means, said video processor means and to said first coordinate storage means, for developing a first logic signal if the first stored coordinate position is scanned by said sensor between the time of occurrence of the first and second timing signals on an individual sensor scan along a first coordinate;

digital signal generating means, coupled to said sensor means and to said first logic gating means, for developing a series of digital area signals which are numerically representative of the area increments of the object being scanned by said sensor during the time of occurrence of the first logic signal;

second logic gating means, coupled to said first logic gating circuit means, to said video processor means and to said sensor means, for developing a second logic signal if the first logic signal is absent during a successive sensor scan along the first coordinate;

and third logic gating means, coupled to said first and second logic gating means and to said second coordinate storage means, for developing a computation signal upon the occurrence of the second logic signal if the first logic signal has been generated continually during sensor scans on opposite sides of the second stored coordinate position.

11. The system as set forth in claim 8 in said digital processor means includes:

first counting means, coupled to said logic means and said first coordinate storage means for developing a first series of digital difference signals numerically representative of the difference between the number of digital area signals to the left and to the right of the first stored coordinate position;

and second counting means, coupled to said logic means and said second coordinate storage means, for developing a second series of digital difference signals numerically representative of difference between the number of digital area signals above and below the second stored coordinate position.

12. A system as set forth in claim 10 in which said second logic gating means includes a plurality of latching circuits coupled in series between said first and third logic gating means, for developing a second logic signal if the first logic signal is consecutively absent during a predetermined number of sensor scans along the first coordinate.

13. The system as set forth in claim 10 in which said digital processor means includes:

first digital counting means, coupled to said digital signal generating means and to said first coordinate storage means, for counting the digital area signals that occur during the transducer scan time left of the first stored coordinate position;

second digital counting means, coupled to said digital signal generating means and to said first coordinate storage means, for counting the digital area signals that occur during the transducer scan time right of the first stored coordinate position;

third digital counting means, coupled to said digital signal generating means and said second coordinate storage means, for counting the digital area signals that occur during the transducer scan time above the second stored coordinate position;

fourth digital counting means, coupled to said digital signal generating means and said second coordinate storage means, for counting the digital area signals that occur during the transducer scan time below the second stored coordinate position;

reset means coupled to the first, second, third and fourth digital counting means and responsive to the second and third logic gating means, for resetting the digital counting means if the second logic signal occurs in the absence of the computation signal;

first digital subtraction means coupled to said first and second digital counting means, and to said third logic gating means for developing a first series of digital difference signals which are numerically representative of the difference between the number of digital area signals counted to the left and right of the first stored coordinate position;

and second digital subtraction means coupled to said third and fourth digital counting means, and to said third logic gating means for developing a second series of digital difference signals which are numerically representative of the difference between the number of digital area signals counted above and below the second stored coordinate position.

14. The system as set forth in claim 13 in which said updating means includes:

means, coupled to said logic means and responsive to the sensor signals corresponding to the designated object, for determining the relative dimensions of the designated object;

first integrating means, coupled to said dimension determining means and to said first digital subtraction means, for updating the first stored coordinate position as a function of the dimension of the designated object along the first coordinate;

and second integrating means, coupled to said dimension determining means and to said second digital subtraction means, for updating the second stored coordinate position as a function of the dimension of the designated object along the second coordinate.

15. A system for determining the location of a designated object in response to energy received from a sector of space, comprising:

sensor means for producing signals which are amplitude representative of the relative intensity of the received energy;

acquisition means coupled to said sensor means and responsive to the sensor signals for determining the approximate location of a designated object;

means coupled to said acquisition means for storing the approximate location of the designated object;

logic means responsive to the sensor signals for distinguishing the designated object from other objects by a comparison of the location of the objects to the stored approximate location of the designated object;

updating means for updating the stored approximate location of the designated object; and digital processor means coupled to said updating means and logic means and being responsive to the sensor signals corresponding to the designated object for determining the difference between the location of the designated object and the stored location; said digital processor means further including means coupled to said logic means for generating series of digital signals that numerically represent increments of area of the designated object; means coupled to said digital signal generator means for counting the number of digital signals on opposite sides of the stored reference location; and means coupled to said counting means for generating series of digital pulses which numerically represent the difference in the number of digital signals counted on opposite sides of the stored reference location.

PO-1050
(5/69)

UNITED STATES PATENT OFFICE
CERTIFICATE OF CORRECTION

Patent No. 3,586,770      Dated June 22, 1971

Inventor(s) ROBERT L. BONEBREAK and WILLIAM A. CHAMBERS

It is certified that error appears in the above-identified patent and that said Letters Patent are hereby corrected as shown below:

Column 4, line 22, "$V_{ref.1}$," should be --$V_{ref.-}$,--.

Column 5, line 6, "$V_{ref.1}$" should be --$V_{ref.-}$--.

Column 8, line 12, "$Y^1$" should be --$\overline{Y}$--;

Column 8, line 16, "$Y^1$" should be --$\overline{Y}$--;

Column 8, line 21, "$Y^1$" should be --$\overline{Y}$--;

Column 8, line 43, "$Y^1$" should be --$\overline{Y}$--;

Column 8, line 54, "$Y^1$" should be --$\overline{Y}$--;

Column 8, line 64, "state" should be --stage--.

Column 11, line 21, "and" should be --AND--;

Column 11, line 25, "$X_h$" should be --$X_{xh}$--;

Column 11, line 55, before "current" insert --integral of the--;

Column 11, line 55, change "280" to --282--.

Column 14, line 50, change "Agate" to --gate--.

Signed and sealed this 15th day of February 1972.

(SEAL)
Attest:

EDWARD M. FLETCHER, JR.
Attesting Officer

ROBERT GOTTSCHALK
Commissioner of Patents